March 17, 1970 K. R. MACHEIN ET AL 3,501,584

APPARATUS FOR PRODUCING A SINGLE PICTURE SIGNAL FROM A COMPOSITE VIDEO SIGNAL FOR DISPLAY IN A TELEVISION RECEIVER

Filed April 20, 1966 11 Sheets-Sheet 1

INVENTORS.
KURT R. MACHEIN
JOHN T. PHAN
ARTURO E. STOSBERG

BY Robert Mednick

ATTORNEY

INVENTORS
KURT R. MACHEIN
JOHN T. PHAN
ARTURO E. STOSBERG
BY Robert Mednick
ATTORNEY March 17, 1970 K. R. MACHEIN ET AL 3,501,584
APPARATUS FOR PRODUCING A SINGLE PICTURE SIGNAL FROM
A COMPOSITE VIDEO SIGNAL FOR DISPLAY
IN A TELEVISION RECEIVER
Filed April 20, 1966 11 Sheets-Sheet 3

INVENTORS.
KURT R. MACHEIN
JOHN T. PHAN
ARTURO E. STOSBERG
BY Robert Meduick
ATTORNEY INVENTORS.
KURT R. MACHEIN
JOHN T. PHAN
ARTURO E. STOSBERG
BY Robert Hedrick
ATTORNEY

INVENTORS.
KURT R. MACHEIN
JOHN T. PHAN
ARTURO E. STOSBERG

BY Robert Medwick

ATTORNEY

*INVENTORS.*
KURT R. MACHEIN
JOHN T. PHAN
ARTURO E. STOSBERG

BY [signature]

ATTORNEY

INVENTORS.
KURT R. MACHEIN
JOHN T. PHAN
ARTURO E. STOSBERG
BY Robert Jedwick
ATTORNEY INVENTORS
KURT R. MACHEIN
JOHN T. PHAN
BY ARTURO E. STOSBERG
Robert Hedrick
ATTORNEY March 17, 1970 K. R. MACHEIN ET AL 3,501,584

APPARATUS FOR PRODUCING A SINGLE PICTURE SIGNAL FROM A COMPOSITE VIDEO SIGNAL FOR DISPLAY IN A TELEVISION RECEIVER

Filed April 20, 1966 11 Sheets-Sheet 9

INVENTORS
KURT R. MACHEIN
JOHN T. PHAN
ARTURO E. STOSBERG

BY Robert Mednick

ATTORNEY

INVENTORS.
KURT R. MACHEIN
JOHN T. PHAN
ARTURO E. STOSBERG
BY Robert Mednick
ATTORNEY March 17, 1970 K. R. MACHEIN ET AL 3,501,584

APPARATUS FOR PRODUCING A SINGLE PICTURE SIGNAL FROM
A COMPOSITE VIDEO SIGNAL FOR DISPLAY
IN A TELEVISION RECEIVER

Filed April 20, 1966 11 Sheets-Sheet 11

INVENTORS
KURT R. MACHEIN
JOHN T. PHAN
BY ARTURO E. STOSBERG

Robert Nediuick
ATTORNEY

United States Patent Office 3,501,584

Patented Mar. 17, 1970

3,501,584

APPARATUS FOR PRODUCING A SINGLE PICTURE SIGNAL FROM A COMPOSITE VIDEO SIGNAL FOR DISPLAY IN A TELEVISION RECEIVER

Kurt R. Machein, Palo Alto, and John T. Phan, Redwood City, Calif., and Arturo E. Stosberg, Regensdorf, Switzerland, assignors, by mesne assignments, to Data Memory, Inc., Mountain View, Calif., a corporation of California Filed Apr. 20, 1966, Ser. No. 543,915

Int. Cl. H04n *5/78;* G11b *5/56, 5/82*

U.S. Cl. 178—6.6 27 Claims

ABSTRACT OF THE DISCLOSURE

An apparatus for selecting a single still picture from a moving picture television signal to be repetitively reproduced and to be immediately substituted for the television signal. The single still picture is formed by duplicating the first field and interlacing the duplicated first field as the second field with the first field to display a frame.

Figure 1:
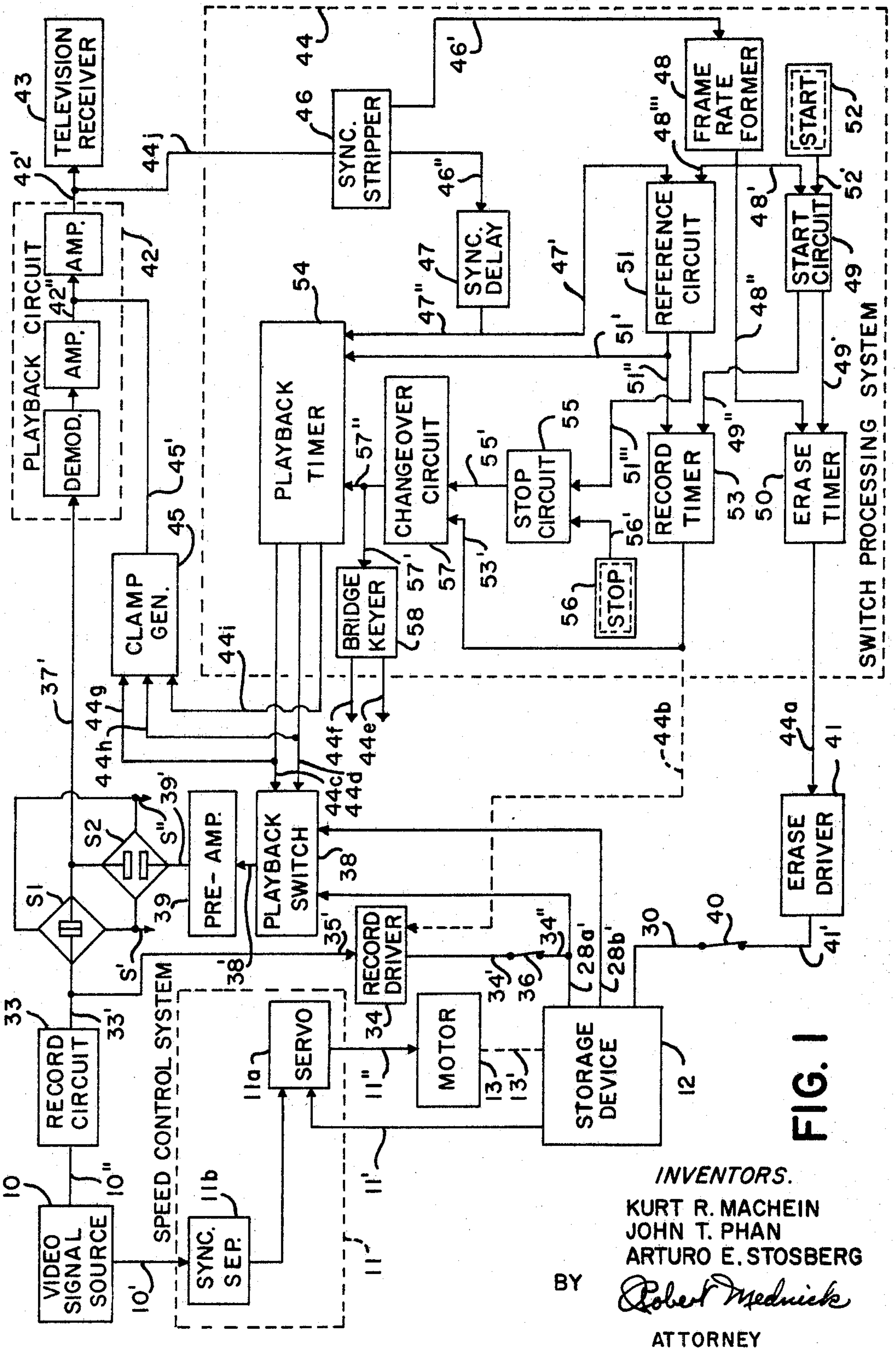

The present invention relates to an apparatus for producing a single picture signal from a composite video signal, and more particularly relates to an apparatus for producing a single picture signal from a composite video signal which can be viewed on a television receiver for the composite television signal.

A composite video or television signal is one that contains all the information needed to repetitively reproduce a series of single pictures in a television receiver. In addition to picture information, the composite television signal includes horizontal and vertical synchronization pulses in order to time the reproduction of the single pictures contained therein. When applied to a television receiver, the series of single pictures of the composite television signal are rapidly reproduced to form a visually continuous and changing motion picture.

In the United States standards of television broadcasting, each complete picture or frame in the composite television signal contains 525 horizontal lines of information. The frame repetition rate has been standardized at 30 per second. Each frame of a single television signal is divided into two fields which consist of one-half of the 525 horizontal lines per frame, or 262.5 horizontal lines per field. Since two fields are included in each frame, the repetition rate of the fields are 60 per second, or twice that of the frame repetition rate. In order to synchronize the horizontal line scanning in a television receiver, a horizontal synchronization pulse is included in the composite video signal for each horizontal line of picture information. The horizontal synchronization pulses of alternate fields are one-half horizontal line cycle out of phase. Similarly, a vertical snychronization pulse is included for each field to maintain vertical scanning synchronization. The horizontal and vertical synchronization pulses are transmitted during the scanning retrace times, when the screen in the television receiver is blanked out and no picture information is transmitted. Alternate fields being out of phase with each other by a one-half horizontal line interval cause interlace scanning in the television receiver. Consequently, the composite television signal can produce a series of complete single pictures or frames, each of which includes a pair of interlaced picture fields.

A video recorder and reproducer apparatus is capable of receiving the composite television signal, recording it on a storage member, and subsequently reproducing the recorded signal. It is at times desirable to select a single picture signal from a multiple picture composite television signal source, such as from a television camera or broadcast transmitter, and then utilizing such an apparatus to repetitively reproduce a single picture signal as long as desired. A television monitor or receiver will thereupon be enabled to display a single still picture.

However, it will be realized, that in a composite television signal which generally represents moving scenes, the picture information in one field of a television signal may be slightly different from that in an adjoining field due to movement occurring in the intervening time of $1/60$ of a second. If a complete frame of a composite television signal is repetitively reproduced, the slightly different picture information in its interlacing fields will cause an objectionable flicker in the picture seen on the screen of a television monitor or television receiver. A completely still picture will not be reproduced. Nevertheless, in reproducing a single picture of a television signal, it is desired to have picture information during the entire frame of the television signal.

The apparatus of the present invention enables a completely still picture to the reproduced in a television receiver. In order to do so, a novel still picture single frame signal is developed. This still picture single frame signal includes the picture information from a single field of a composite television signal which is duplicated during its alternate field. In order to enable a television receiver to reproduce the still picture single frame signal in the same manner as it does for a composite television signal containing moving pictures, the horizontal and vertical sync pulses of a whole frame of a composite television signal are also reproduced. As a result, the still picture single frame signal developed by the apparatus of this invention can be applied to a television receiver to maintain the interlace scanning pattern resulting from an ordinary composite television signal with moving pictures and yet display a truly still picture.

It is therefore an object of this invention to provide an apparatus for producing a single picture signal from a composite video signal.

Another object of this invention is to provide an apparatus for producing a single picture signal from a composite video signal which can be viewed on a television receiver for the composite video signal.

Still another object of this invention is to provide an apparatus for producing a single picture signal from a composite video signal which can be viewed as an interlaced composite video on a television receiver.

A further object of this invention is to provide an apparatus for producing a single picture signal from a composite video signal which will be seen as an actual still picture on a television receiver.

A still further object of this invention is to provide an apparatus for producing a single frame signal from a composite video signal which can be applied to a television receiver to show a still picture as long as desired.

Still a further object of this invention is to provide an apparatus for producing a still picture, single frame signal from a composite video signal without disturbing or losing any of the synchronization signals thereof.

Another object of this invention is to provide an apparatus for receiving a moving picture television signal, selectively recording a portion thereof, and then immediately reproducing a single picture signal to be substituted for said moving picture television signal without losing continuity of a picture signal.

Still another object of this invention is to provide a switch processing system for an apparatus including a storage device with transducer units for recording and reproducing a moving picture television signal in order to form a single picture signal with the same sync signal of said television signal and having identical picture information in each field thereof.

A further object of this invention is to provide a switch processing system for an apparatus including a storage device with transducer units for recording and reproducing a moving picture television signal in order to selectively record a portion of said television signal, and then immediately reproducing a single picture signal to be substituted for said television signal without losing continuity of a picture signal.

The novel features which are believed to be characteristic of the invention, both as to its organization and method of operation, together with further objects and advantages thereof, will be better understood from the following description considered in connection with the accompanying drawings in which an embodiment of the invention is illustrated by way of example. It is to be expressly understood, however, that the drawings are for the purpose of illustration and description only, and are not intended as a definition of the limits of the invention.

In the video or television field, the term "sync" for brevity purposes is often used for "synchronization," and will also be so used in the following description.

FIG. 1 is a simplified block diagram illustrating a video recording and reproducing apparatus incorporating the present invention.

Figures 2A, 2B:
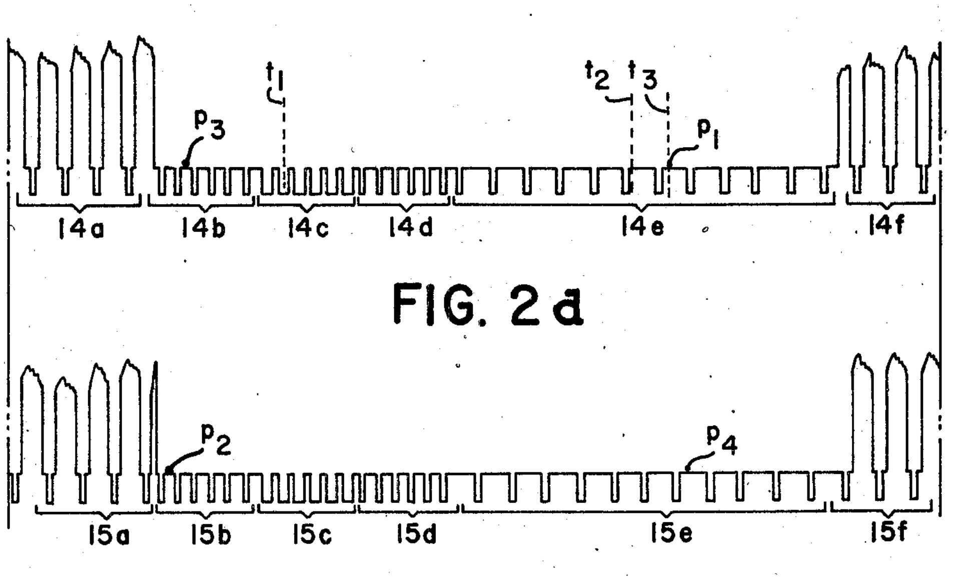

FIG. 2*a* shows a portion of the waveform of a typical composite television signal, and shows the sync pulses during a vertical blanking interval of one field of the television signal.

FIG. 2*b* is a view similar to FIG. 2*a* but shows the sync pulses during a next occurring blanking interval for an alternate field of the television signal.

Figure 3A:
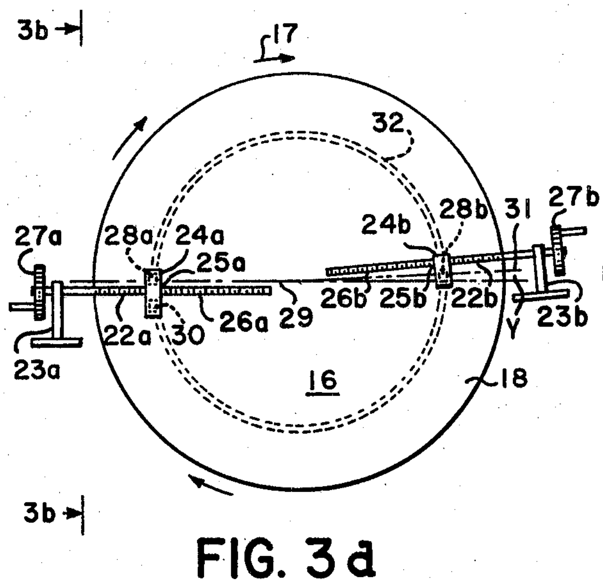

FIG. 3*a* is a top view of a storage member with its associated transducer units used in the storage device shown in block form in FIG. 1.

Figure 3B:
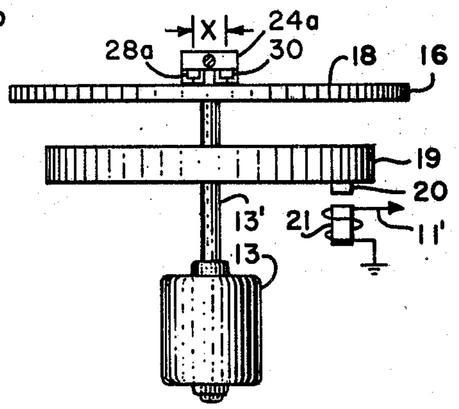

FIG. 3*b* is a side view of the storage member and the transducer units as seen along lines 3*b*—3*b* in FIG. 3*a*.

Figure 4A:
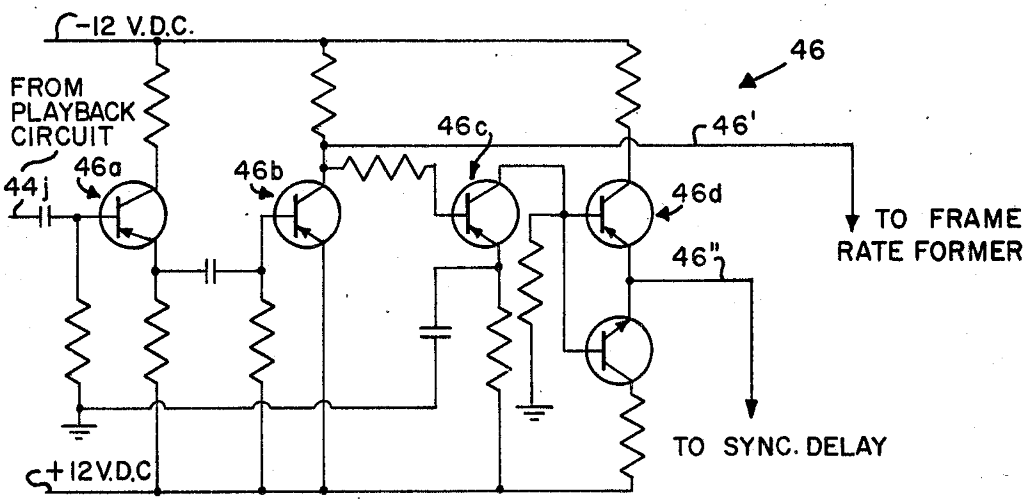

FIG. 4*a* is a schematic circuit diagram of the sync stripper shown in block form in FIG. 1.

Figure 4B:
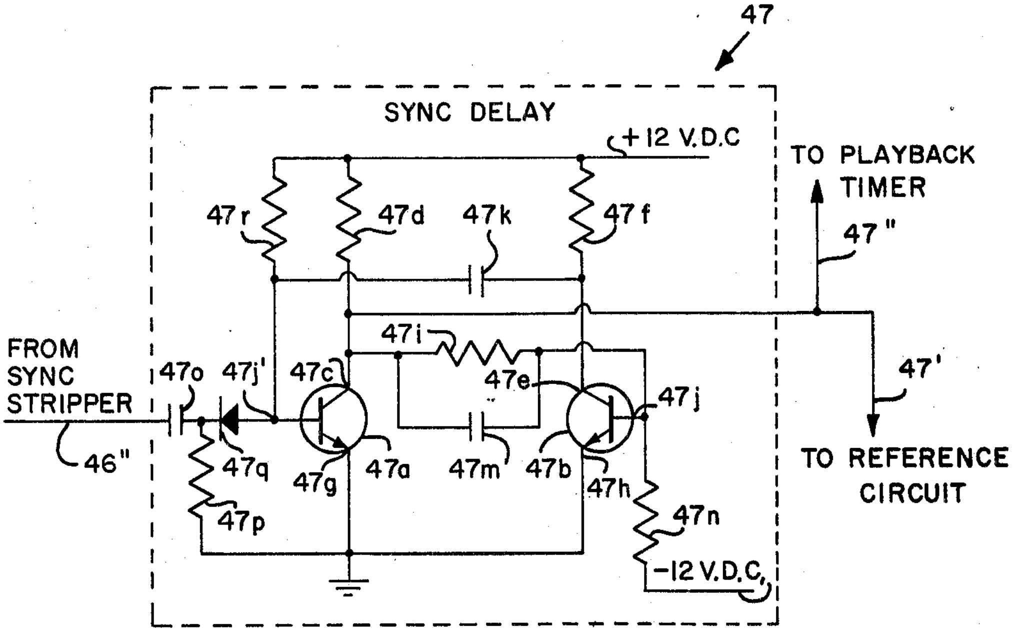

FIG. 4*b* is a schematic circuit diagram of the sync delay shown in block form in FIG. 1.

Figure 4C:
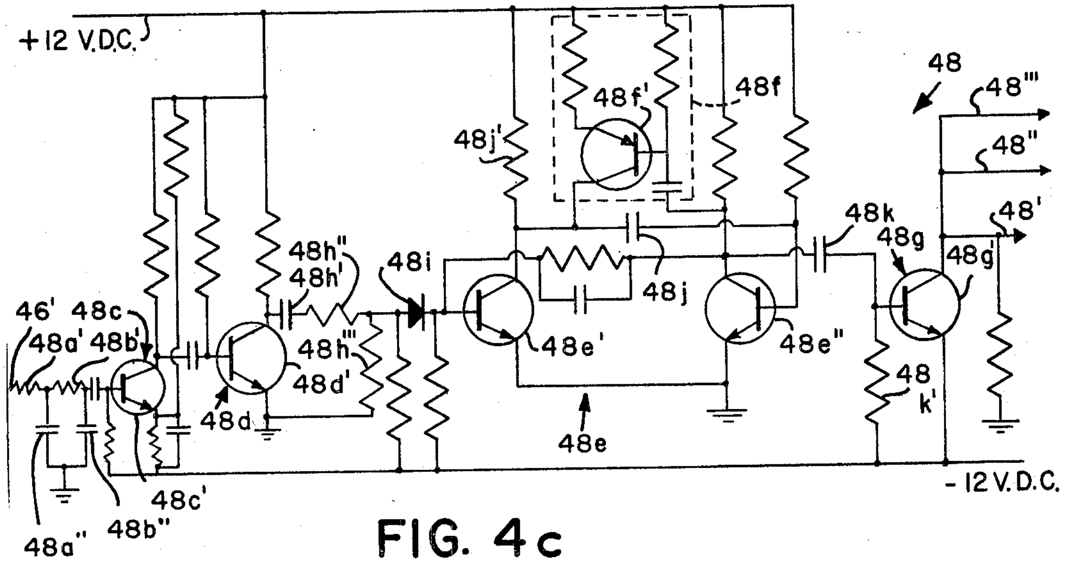

FIG. 4*c* is a schematic circuit diagram of the frame rate former shown in block form in FIG. 1.

Figure 4D:
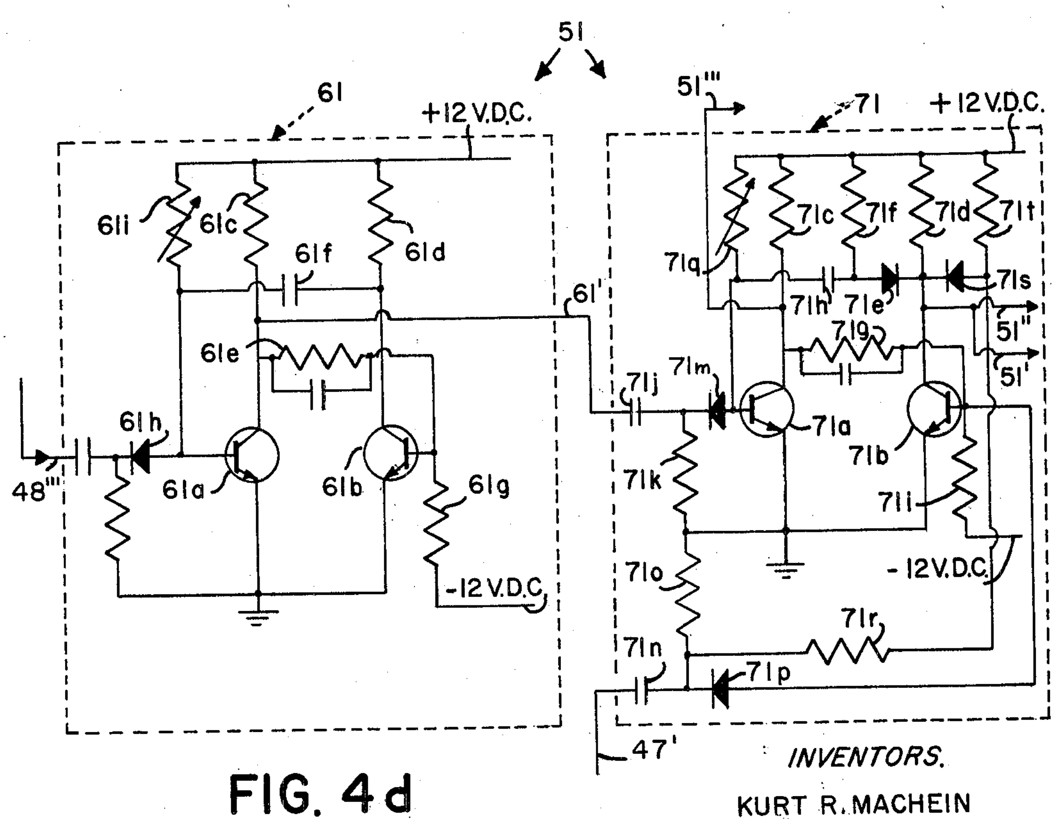

FIG. 4*d* is a schematic circuit diagram of the reference circuit shown in block form in FIG. 1.

Figures 4E, 4F, 4G:
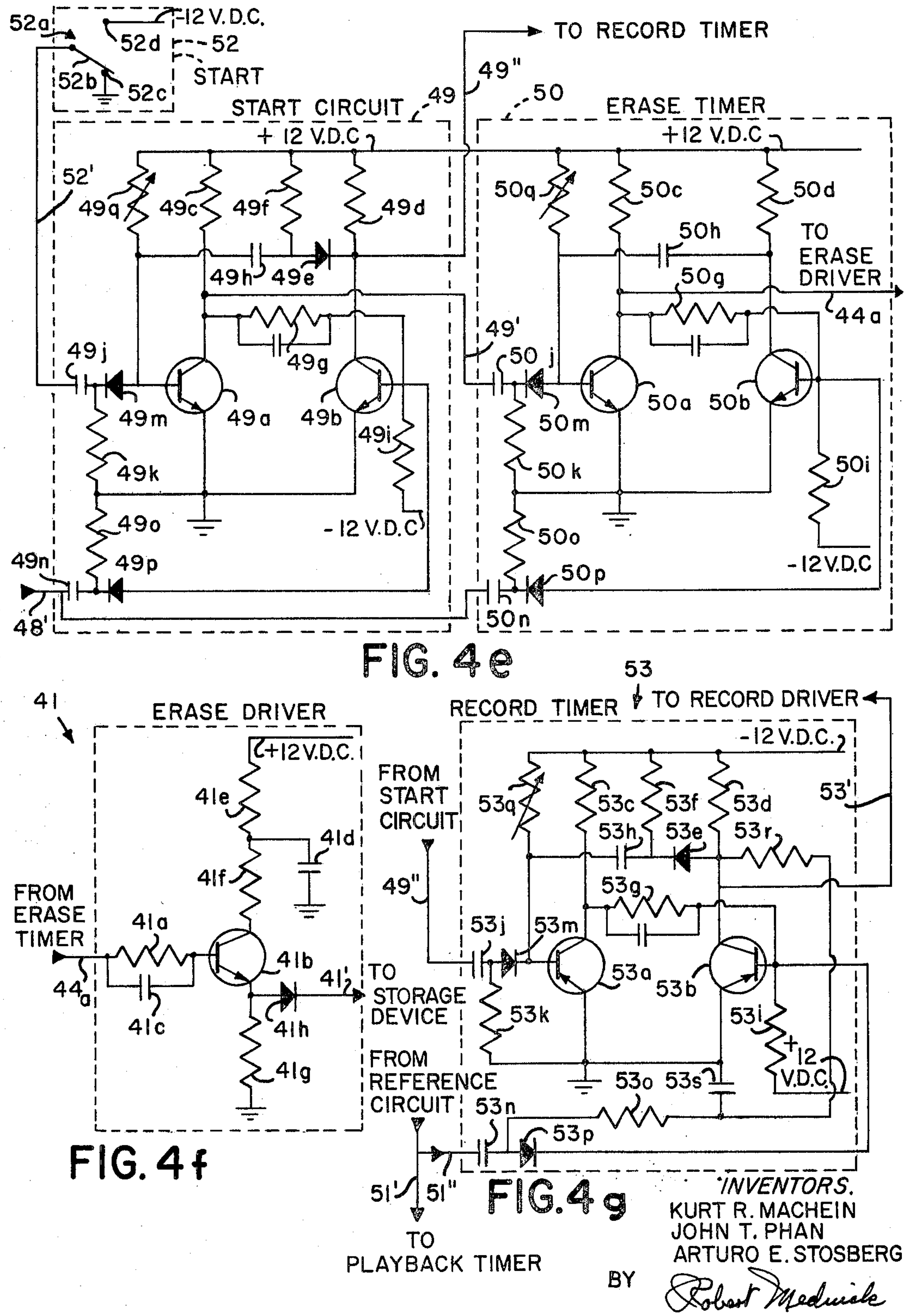

FIG. 4*e* is a schematic circuit diagram of the start actuator, start circuit, and erase timer shown in block form in FIG. 1.

FIG. 4*f* is a schematic circuit diagram of the erase driver shown in block form in FIG. 1.

FIG. 4*g* is a schematic circuit diagram of the record timer shown in block form in FIG. 1.

Figures 4H, 4I:
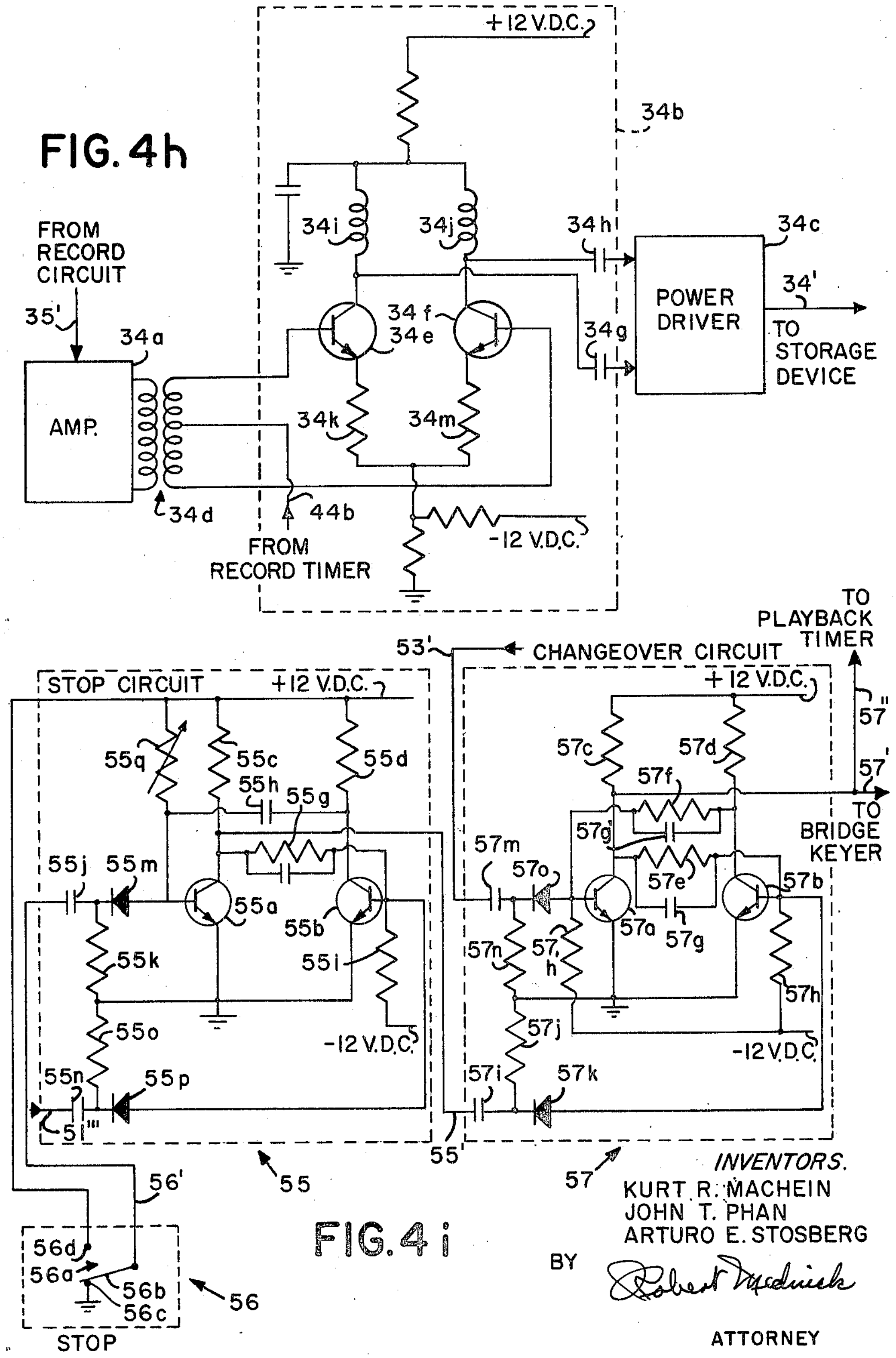

FIG. 4*h* shows the schematic circuit diagram of a gating circuit that may be used in the record driver shown in block form in FIG. 1.

FIG. 4*i* is a schematic circuit diagram of the stop actuator, stop circuit, and changeover circuit shown in block form in FIG. 1.

Figure 4J:
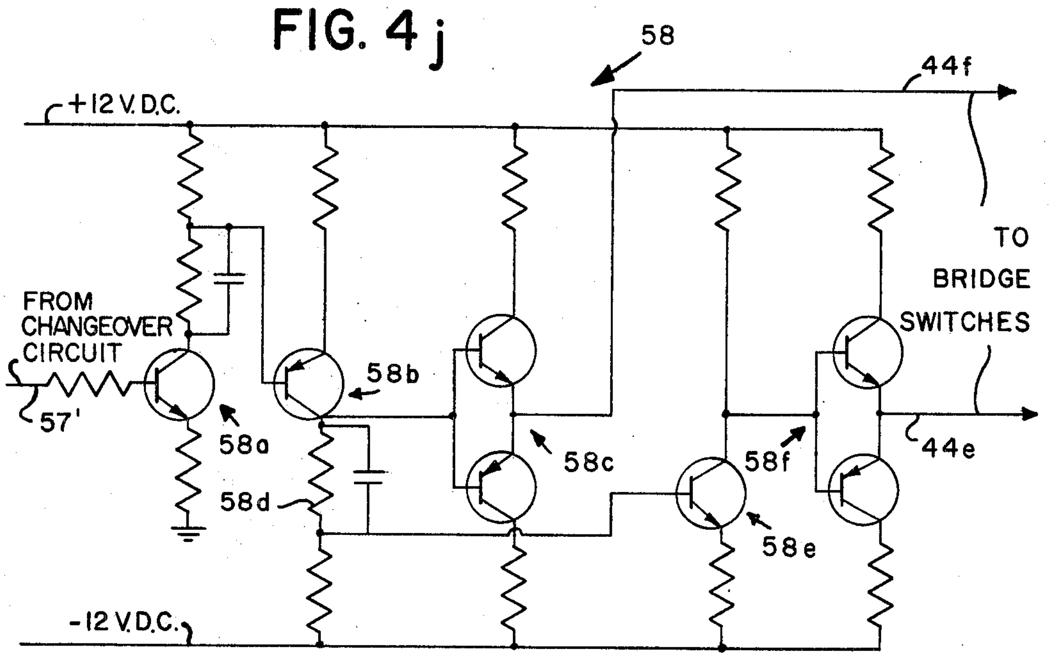

FIG. 4*j* is a schematic circuit diagram of the bridge keyer shown in block form in FIG. 1.

Figure 4K:
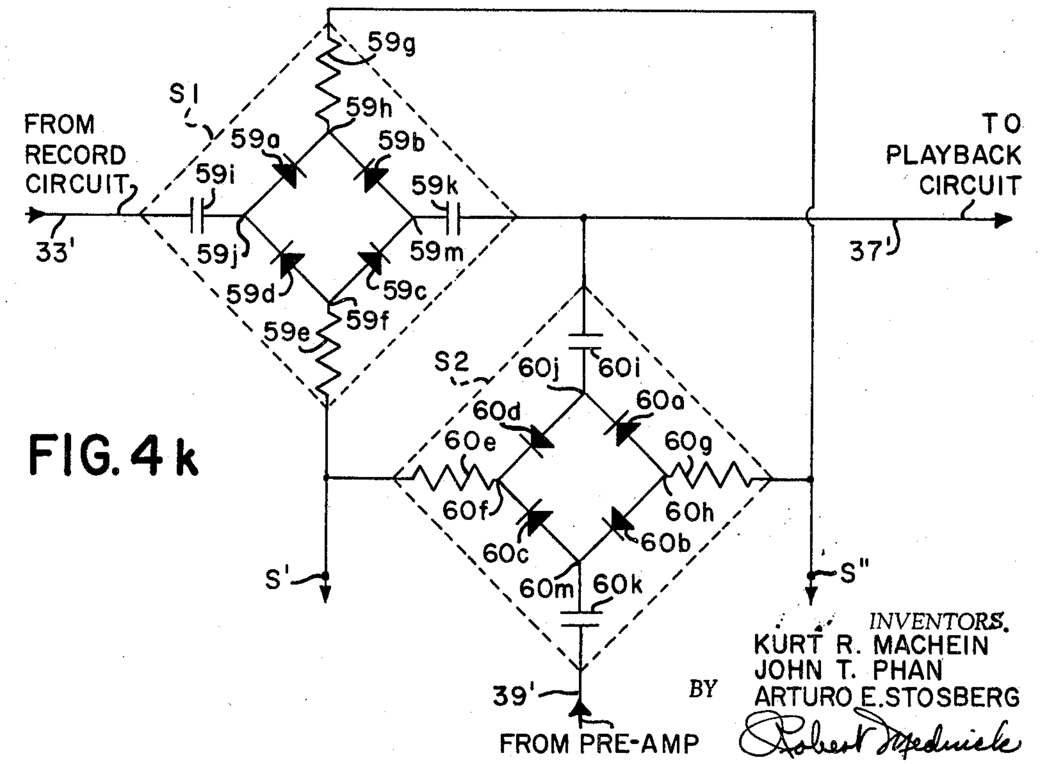

FIG. 4*k* is a schematic circuit diagram of the bridge switches shown in FIG. 1.

Figure 5:
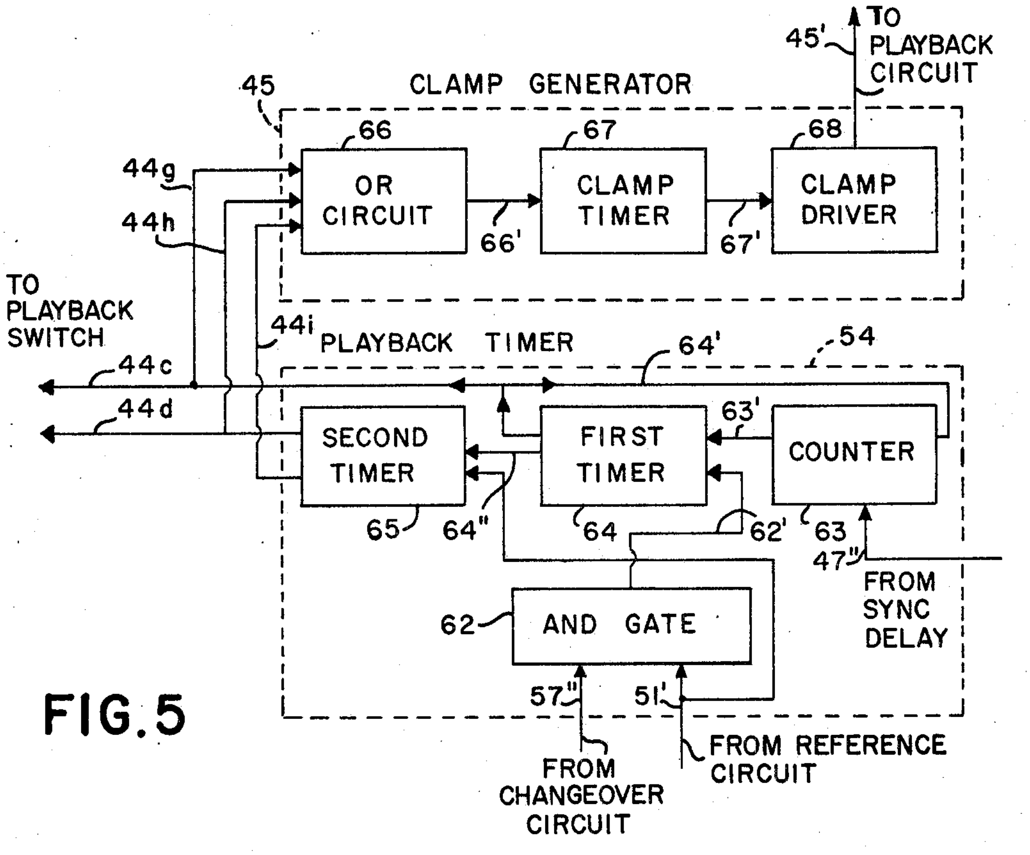

FIG. 5 is a detailed block diagram of the playback timer and clamp generator shown in a simplified block form in FIG. 1.

Figure 6A:
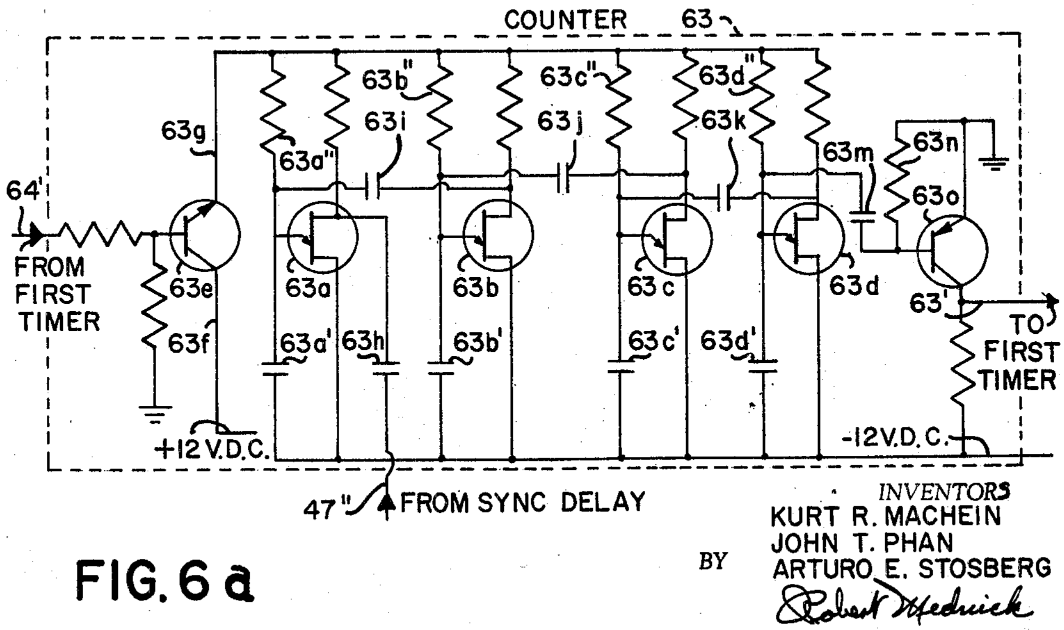

FIG. 6*a* is a schematic circuit diagram of the counter shown in block form in FIG. 5.

Figures 6B, 6C:
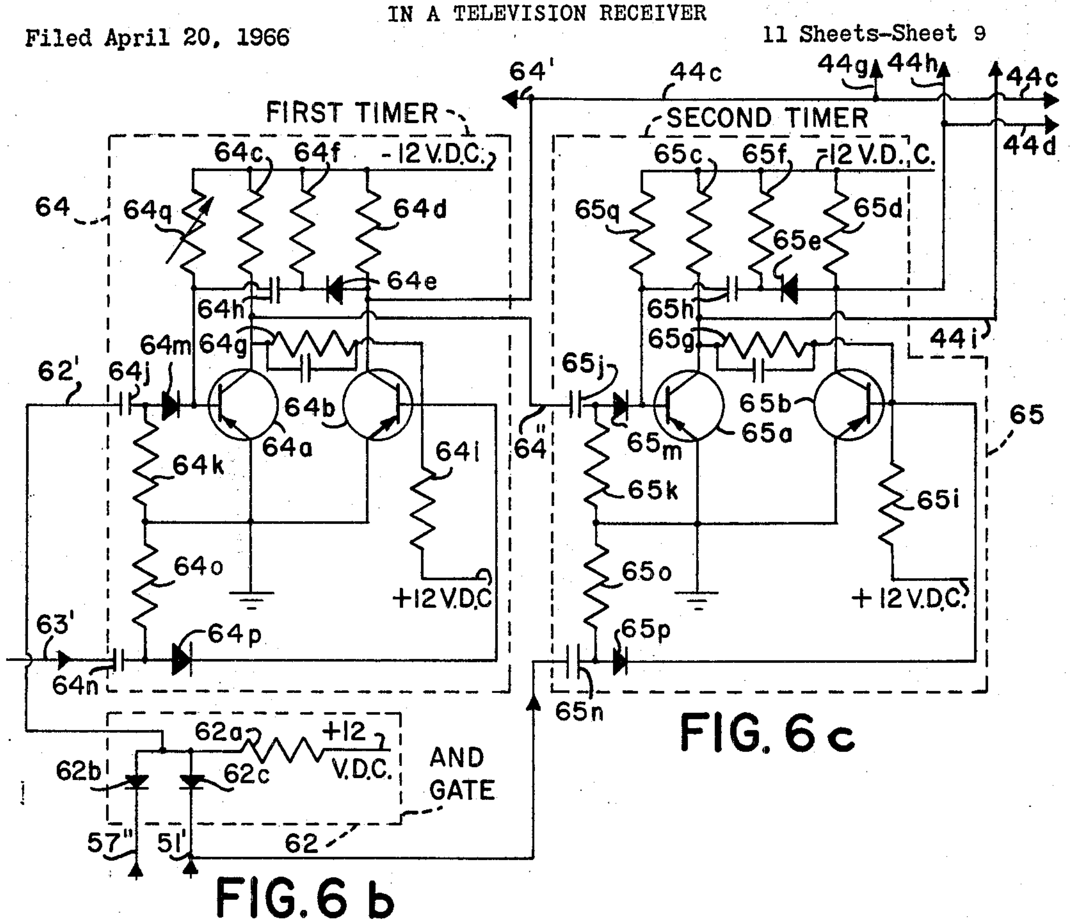

FIG. 6*b* is a schematic circuit diagram of the and gate and first timer shown in block form in FIG. 5.

FIG. 6*c* is a schematic circuit diagram of the second timer shown in block form in FIG. 5.

Figure 6D:
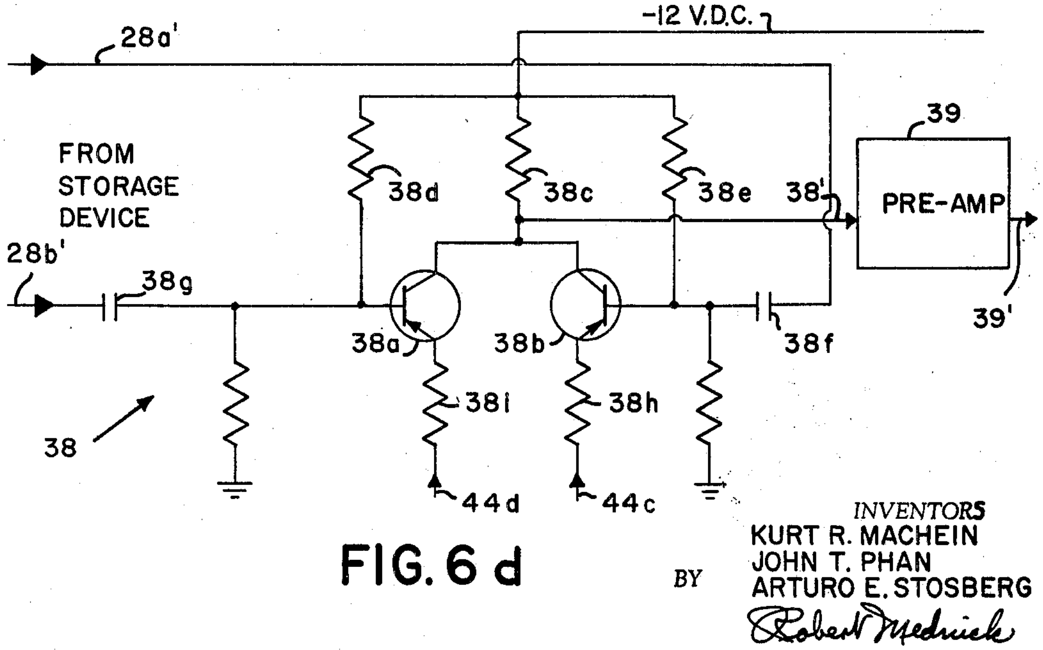

FIG. 6*d* is a schematic circuit diagram of the playback switch shown in block form in FIG. 1.

Figure 6E:
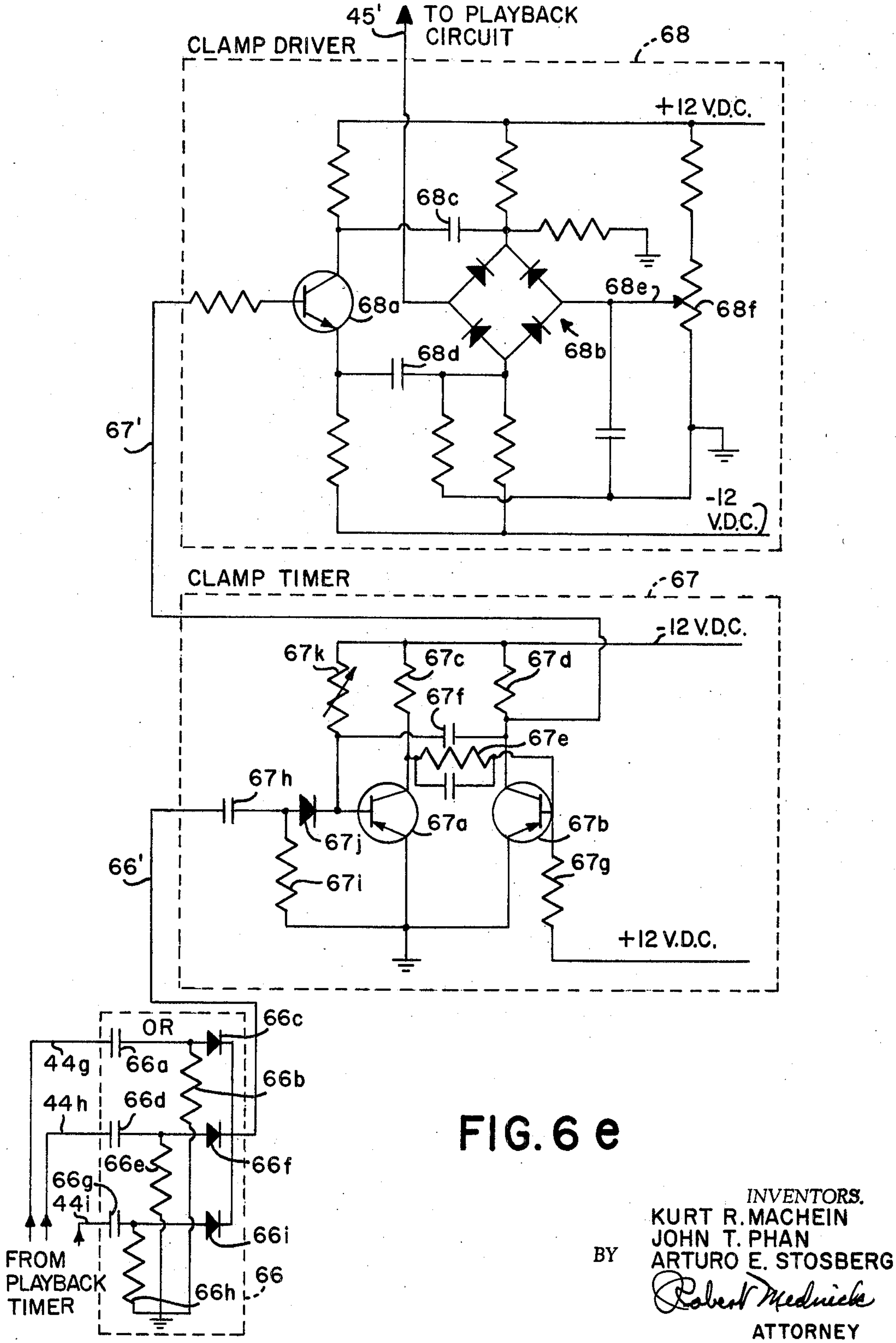

FIG. 6*e* is a schematic circuit diagram of the or circuit, clamp timer, and clamp driver shown in block form in FIG. 5.

Figure 7:
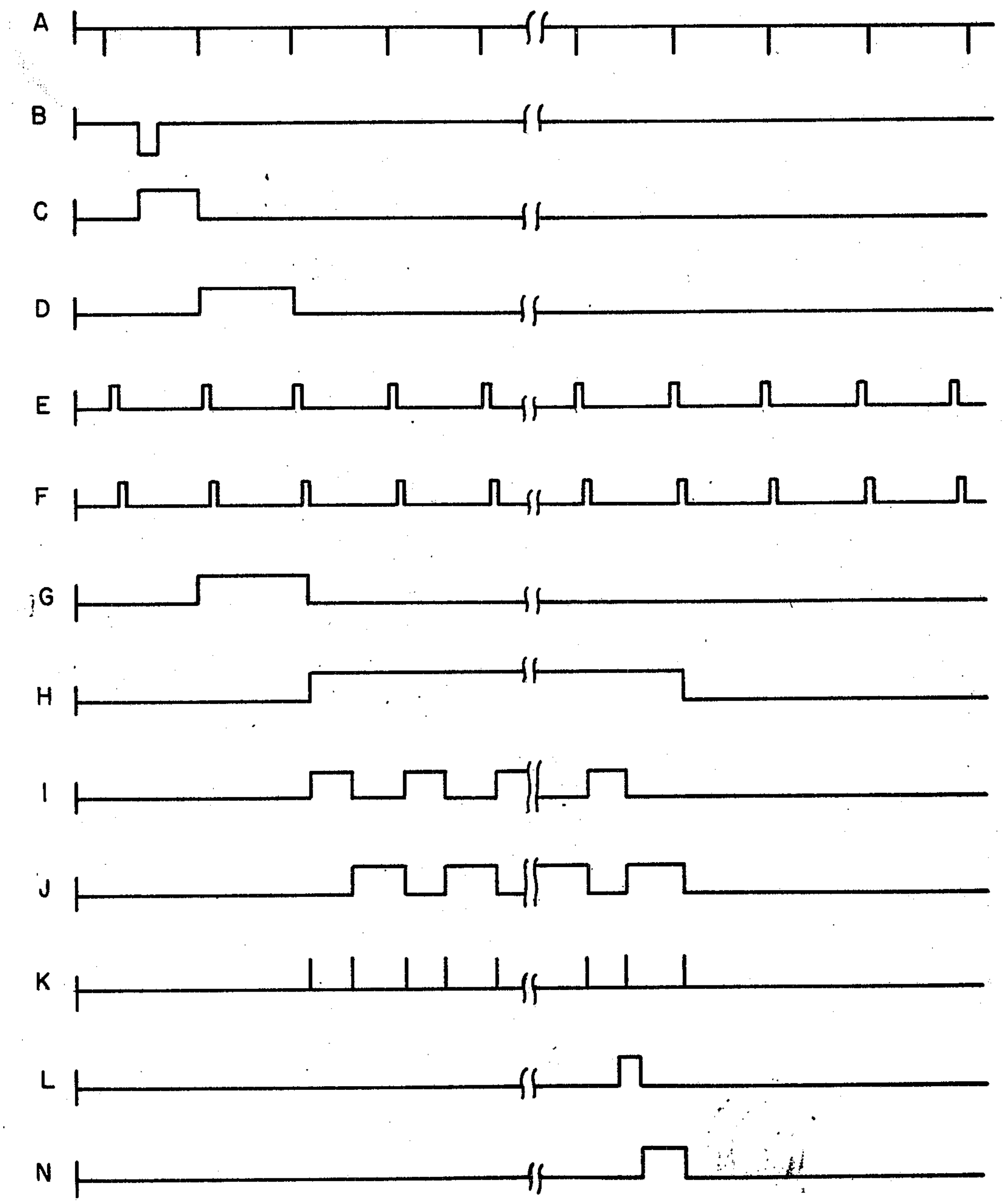

FIG. 7 is a graph showing several waveforms at various points in the video recording and reproducing apparatus seen in FIG. 1, and illustrates their time relationships when a composite single picture signal is developed from a composite moving picture television signal during recordation and playback.

Referring now to the figures, there is seen in FIG. 1 a simplified block diagram illustrating a video and reproducing apparatus incorporating the present invention. A video signal source 10 is connected by line 10′ to a speed control system 11 which in turn is connected to a storage device 12 by line 11′ and to a motor 13 by drive shaft 13′.

Video signal source 10 produces a multiple composite television signal that contains all the signal information needed to reproduce a series of single picture signals in a television receiver. The multiple composite television signal includes in addition to picture information, horizontal and vertical blanking and synchronization signals. When reproduced in a television receiver, the series of single picture signals form a visually continuous and changing motion picture. FIG. 2*a* illustrates a portion of the wave-form of a typical television signal with a picture frame of 525 horizontal lines, which shows the last few lines **14*a* of a picture signal in a television field, which are consecutively followed by six equalizing pulses 14*b*, a serrated vertical sync pulse 14*c*, another six equalizing pulses 14*d*, several horizontal sync pulses 14*e*, and then by several lines 14*f*** of the picture signal in the next occurring television field. FIG. 2*b* is a view similar to FIG. 2*a*, but shows the waveform of the television signal during a next occurring blanking interval for an alternate field of the television signal. The picture information signals in alternate single picture fields are displaced at half horizontal line intervals to produce interlacing pictures in the television receiver. As shown in FIG. 2*b*, the last few lines **15*a* of the picture signal in this alternate field are consecutively followed by six equalizing pulses 15*b*, a serrated vertical sync pulse 15*c*, another six equalizing pulses 15*d*, several horizontal sync pulses 15*e*, then by several lines 15*f*** of the picture signal. As the alternate fields of the composite television signal are out of phase with each other by a one-half horizontal line interval, a continual series of interlaced single picture frames are reproduced in a television receiver. In FIGURES 2*a* and 2*b*, the vertical sync pulses of the alternate fields are vertically aligned.

Referring now to FIGS. 3*a* and 3*b*, there is seen the rotary storage member, magnetic transducers and associated mechanisms of the storage device 12 seen in FIG. 1. Electric motor 13 is connected by drive shaft 13′ to rotate storage member 16 in the direction shown by arrow 17. Storage member 16 is an aluminum disc having magnetic material deposited on the top surface 18 thereof. A flywheel 19 is seen connected to turn with drive shaft 13′ and has a small magnet 20 secured to its underside as seen in FIG. 3*b*. A pick up coil 21 is fixedly positioned near magnet 20 to have a pulse induced therein during each cycle of rotation of drive shaft 13′ when magnet 20 passes by coil 21. As storage member or disc 16 is rotated by motor 13, a positioning pulse is induced in coil 21 during each revolution thereof which appears on line 11′.

In FIG. 3*a*, a first support arm is seen to include a positioning rod **22*a* jounralled in fixed bearing support 23*a*. A transducer housing 24*a* has a threaded bore 25*a* engaging the threaded portion 26*a* of rod 22*a* so that hand crank 27*a* connected to rod 22*a* may be rotated to move transducer housing 24*a* along rod 22*a*. Transducer housing 24*a* carries a first magnetic head or transducer unit 28*a* having operating gap edges contacting the top surface 18 of disc 16 on diameter line 29. Transducer housing 24*a* also carries an erase head 30 having erase gap edges contacting top surface 18 of disc 16 spaced from transducer head 28***a* at distance X, therefrom. A second support arm is also seen to include another positioning rod 22*b* journalled in fixed bearing support 23*b*. Another transducer housing 24*b* has a threaded bore 25*b* engaging the threaded portion 26*b* of rod 22*b* so that hand crank 27*b* connected to rod 22*b* may be rotated to move transducer housing 24*b* along rod 22*b*. Transducer housing 24*b* carries a second magnetic head or transducer unit 28*b* having operating gap edges contacting the top surface 18 of disc 16 on radius line 31 at an angle Y with respect to diameter line 29. An example of such transducer heads and method of attachment to their housings is shown in copending patent application of Robert Fred Pfost and Walter Earl Lock, Ser. No. 431,083, now Patent No. 3,397,289 filed Feb. 8, 1965, entitled "A Magnetic Transducer Head Device," and assigned to the same assignee as this invention. Housings 24*a* and 24*b* are positioned by cranks 27*a* and 27*b* respectively, so that transducer units 28*a* and 28*b* have their operating gap edges traverse a single circular track at a selected radial distance on disc 16, such as circular track 32 seen in FIG. 3*a*. Transducer units 28*a* and 28*b* are designed to be used either as a record head or playback head.

Referring again to FIG. 1, a speed control system 11 is shown connected between video signal source 10 and storage device 12 in order to control the rotational speed of disc 16 contained in storage device 12 in accordance with the frame rate of the television signal. Servo 11*a* operates to compare the vertical sync signal derived from vertical sync separator 11*b* with the positioning signal on on line 11′ and controls the rotational speed and phase alignment of motor 13 (and hence also that of disc 16) to synchronize its speed and phase alignment with that of the frame rate of the television signal. A suitable speed control system is shown in a copending patent application of Kurt R. Machein and Uwe W. Reese, Ser. No. 257,483, filed Feb. 11, 1963, entitled "Phase Control System," now Patent No. 3,277,236 and assigned to the same assignee as this invention.

FIG. 1 also shows video signal source 10 supplying a television signal to record circuit 33 via line 10″. The output of record circuit 33 on line 33′ is applied by line 35′ to record driver 34. First transducer unit 28*a* in storage device 12 is connected to receive via line 28*a′* the output signal of record driver 34 appearing on line 34′ through closed switch 36 and line 34″. In addition, first transducer unit 28*a* in storage device 12 is connected by the line 28*a′* to apply its reproduced signals to playback switch 38. Furthermore, second transducer unit 28*b* in storage device 12 is connected to apply its reproduced signals to playback switch 38 via line 28*b′*. The output of playback switch 38 is fed into pre-amplifier 39 by line 38′, which in turn can connect through switch S2 to line 37′. The output on line 33′ of record circuit 33 can connect through switch S1 to line 37′. Erase head 30 is connected by line 30′ through closed switch 40 to receive an erase signal from erase driver 41 by line 41′.

Playback circuit 42 is one that is capable of receiving the signal appearing on line 37′, then demodulating, amplifying and otherwise preparing this signal to be applied by line 42′ to television receiver 43. Switches S1 and S2 are symbolically shown in FIG. 1 as electrical contractors to indicate their functions, however S1 and S2 are preferably electronic switches as hereinafter described which are capable of rapidly changing from being open to closed or vice versa. Switches S1 and S2 are respectively closed and open as seen in FIG. 1, except during the application of a suitable reversal signal to terminals S′ and S″ during which they will be open and closed respectively. Record circuit 33 is a circuit capable of amplifying and modulating a composite moving picture television signal received from video signal source 10 into a desired output. Record driver 34 is a circuit that is normally blocked, i.e. it is biased to prevent the passage therethrough of an input signal except during the period when an unblocking signal is applied as hereinafter described. During the application of an unblocking signal, record driver 34 suitably prepares the output signal from record circuit 33 to be fed to first transducer unit 28*a* for recordation on storage member 16. Pre-amplifier 39 is a circuit for amplifying the small signals reproduced by transducer units 28*a* and 28*b* to an amplitude comparable to the output of record circuit 33. Erase driver 41 is a circuit that requires an actuating signal during which it will develop an erase signal suitable for application to erase head 30 in order to erase any prerecorded signals on a track on storage member 16. Playback switch 38 includes two switching elements as hereinafter described which are separately responsive to playback timing signals to connect lines 28*a′* and 28*b′* to line 38′.

The switch processing system 44 is connected to erase driver 41 by line 44*a*, to record driver 34 by line 44*b*, to playback switch 38 by lines 44*c* and 44*d*, to terminals S′ and S″ of switches S1 and S2 by lines 44*e* and 44*f* respectively, and to clamp generator 45 by lines 44*g*, 44*h*, and 44*i*. The switch processing system 44 is also connected to receive via line 44*j* the output of playback circuit 42 on line 42′.

Prior to starting the switch processing system into producing its several synchronized timing signals, the apparatus of FIG. 1 is in the standby state of operation. During this standby state, an actuating signal is not developed on line 44*a*, an unblocking signal is not present on line 44*b*, and playback timing signals are not available on lines 44*c* and 44*d*. Consequently, storage device 12 is not now utilized for recordation or playback. In addition, as clamp generator 45 also requires actuating signals to enable it to operate, and as clamp generator actuating signals are not available on lines 44*g*, 44*h*, and 44*i*, clamp generator 45 will not supply output clamping pulses on line 45′ to playback circuit 42. Furthermore, a reversal signal is not present on lines 44*e* and 44*f*, therefore switches S1 and S2 are respectively closed and open as seen in FIG. 1. Accordingly, during this standby state of operation, the video signal from video signal source 10 is applied to record circuit 33 to form a modulated signal which is fed into playback circuit 42 to convert it back again to a composite video signal. The signal on line 42′ is then a duplication of the signal output from video signal source 10 which is thereupon visually reproduced on television receiver 43.

When the switch processing system is started, the apparatus of FIG. 1 initially operates to have a single frame of the television signal recorded on circular track 32 on storage member 16 in storage device 12. During this record state of operation, an actuating signal is developed on line 44*a* to enable erase driver 41 to develop an erase signal which is applied to erase head 30 to erase any prerecorded signals that may be present on circular track 32. Also, an unblocking signal is developed on line 44*b* to enable record driver 34 to produce an output signal to be applied to transducer unit 28*a*. Thereupon, transducer unit 28*a* will record the output signal from record circuit 33 on circular track 32 which has been previously erased by erase head 30. The signals on lines 44*c* through 44*i* of switch processing system 44 are the same in this record state of operation as those during the standby state of operation. Consequently, during this record state, the signal output from video signal 10 continues to go through record circuit 33 and playback circuit 42 without interruption while circular track has been erased by erase head 30 and then recorded by transducer unit 28*a*.

The record state of operation is timed by switch processing system 44 to last for a single frame of a composite moving picture television signal. Immediately upon termination of the record state of operation, the switch processing system automatically goes into its playback state of operation. During this playback state of operation, the erase actuating signal is removed from line 44*a*, and the unblocking signal is removed from line 44*b*. Playback timing signals are now alternately applied to the two switching elements of playback switch 38 to alternately connect transducer units 28*a* and 28*b* to line 38′. Consequently, the recorded signal on circular track 32 will be reproduced by transducer units 28*a* and 28*b* to be alternately available on output line 38′ feeding preamplifier 39. Further, a reversal signal is now present on lines 44*e* and 44*f* which respectively opens and closes switches S1 and S2 (the reverse of that shown in FIG. 1). As as result, the output of record circuit 33 is now operationally disconnected, and the reproduced signal output from pre-amplifier 39 is fed through closed switch S2 via line 37′ to playback circuit 42. In addition, clamp generator actuating signals are available on lines 44*g*, 44*h*, and 44*i* to cause clamp generator 45 to produce clamping pulses to eliminate switching transients as hereinafter described. During this playback state of operation, a single picture television signal is thereupon developed on line 42′ which can be viewed by television receiver 43. The playback state of operation continues as long as desired until the switch processing system is turned off or stopped.

When the switch processing system 44 is turned off, then the signals on lines 44*a* through 44*i* revert back to those present during the standby state of operation, and the apparatus of FIG. 1 then operates as aforedescribed for this standby state of operation. During all the aforementioned states of operation, switch processing system 44 is connected by line 44*j* to receive the output signal of playback circuit 42 in order to produce timing signals on lines 44*a* through 44*i* which are selectively timed with respect to the sync signals of the composite output signal of playback circuit 42. Switch processing system 44 times the changeover from standby to record, then to playback, and afterwards back to standby states of operation to occur at predetermined times so that the visually reproduced picture on television receiver 43 is not interrupted, and so that the sync signals of the composite signal appearing on line 42′ are not disturbed.

As seen in FIG. 1, switch processing system 44 includes a sync stripper 46, a sync delay 47, a frame rate former 48, a start circuit 49, an erase timer 50, a reference circuit 51, a start actuator 52, a record timer 53, a playback timer 54, a stop circuit 55, a stop actuator 56, a changeover circuit 57, and a bridge keyer 58. Sync stripper 46 connects to frame rate former 48 by line 46′ and to sync delay 47 by line 46″. In turn, frame rate former 48 connects to start circuit 49 by line 48′, to erase timer 50 by line 48″, and to reference circuit 51 by line 48‴. Start actuator 52 connects to start circuit 49 by line 52′, and the latter connects to erase timer 50 by line 49′ and to record timer 53 by line 49″. Sync delay 47 connects to reference circuit 51 by line 47′ and to playback timer 54 by line 47″. Also, reference circuit 51 connects to playback timer 54 by line 51′ and to record timer 53 by line 51″. Further, reference circuit 51 connects to stop circuit 55 by line 51‴. Said stop actuator 56 connects to stop circuit 55 by line 56′ which in turn connects to changeover circuit 57 by line 55′. Record timer 53 also connects to changeover circuit 57 by line 53′. Finally, changeover circuit 57 connects to bridge keyer 58 by line 57′ and to playback timer 54 by line 57″.

Referring now to FIG. 4*a*, there is seen a schematic circuit diagram of a sync stripper 46 that may be used in switch processing system 44 shown in block form in FIG. 1. Sync stripper 46 is seen to include an emitter follower stage 46*a* coupled to a clipper amplifier 46*b* feeding into an inverter amplifier 46*c* which is followed by a symmetrical emitter follower 46*d*. The output signal of playback circuit 42 appearing on line 42′ is applied by line 44*j* to emitter follower stage 46*a* which provides a high impedance isolating circuit so as not to load playback circuit 42. The output from the emitter of emitter follower stage 46*a* is coupled to clipper amplifier 46*b* which amplifies and passes the sync signal portions of the composite video signal and removes the picture information therefrom. The inverted signal on the collector of clipper amplifier 46*b* is fed to inverter amplifier 46*c* to reinvert the stripped sync signal, which in turn is applied to symmetrical emitter follower 46*d* to again provide a high isolating circuit. The stripped sync signal then appears on line 46″ to be applied to sync delay 47. The inverted stripped sync signal on the collector of clipper amplifier 46*b* also appears on line 46′ to be applied to frame rate former 48.

Referring now to FIG. 4*b*, there is seen a schematic circuit diagram of a sync delay 47 that may be used in the switch processing system 44 shown in block form in FIG. 1. Sync delay 47 is seen to include transistors 47*a* and 47*b* which are connected in a one shot or monostable multivibrator circuit arrangement. Transistor 47*a* has its collector 47*c* connected to a +12 volt D.C. line through load resistor 47*d*, and transistor 47*b* has its collector 47*e* connected to said +12 volt D.C. line through load resistor 47*f*. Both emitters 47*g* and 47*h* are connected to ground. Collector 47*c* of transistor 47*a* is coupled by resistor 47*i* to the base 47*j* of transistor 47*b*, and collector 47*e* of transistor 47*b* is coupled by capacitor 47*k* to the base 47*j*′ of transistor 47*a*. Capacitor 47*m* across resistor 47*i* sharpens the voltage pulse coupled from collector 47*c* to base 47*j*. Resistor 47*n* connects a −12 volt D.C. line to the base 47*j* of transistor 47*b* to provide a sharp cutoff bias preventing leakage current in transistor 47*b* in its off state.

A one shot or monostable multivibrator circuit is one that goes through a complete cycle of operation for each received trigger pulse, and then remains quiescent until another trigger pulse is received. In this case, the multivibrator circuit of sync delay 47 is utilized to provide a predetermined time delay which is determined by the duration of its cycle of operation. In the illustrated circuit of FIG. 4*b*, transistor 47*a* is normally conducting, and transistor 47*b* is normally non-conducting. The potential at the collector of transistor 47*a* is then about zero volts. The sync signal as seen in FIGS. 2*a* and 2*b* after being stripped by sync stripper 46 is applied by line 46″ to be first differentiated by capacitor 47*o* and resistor 47*p*. The negative differentiated pulses representing the leading edges of the sync pulses pass through diode 47*q* to base 47*j* of transistor 47*a* and are the triggering pulses applied to sync delay 47. When transistor 47*a* is caused to be non-conducting by the application of these negative triggering pulses, transistor 47*b* will thereupon conduct. Transistor 47*a* will remain in its cut-off condition for a fixed period of time determined essentially by the time constant of capacitor 47*k* and resistor 47*r*. During this time collector 47*c* of transistor 47*a* is at +12 volts D.C. After the lapse of this fixed period, transistors 47*a* and 47*b* will revert to their normal state, and will remain so until another triggering pulse cause a repetition of this cycle of operation. In this case, the circuit constants of capacitor 47*k* and resistor 47*r* are chosen so that the termination of this fixed period is less than the interval between horizontal sync pulses and occurs in between any sync pulses appearing on line 42′ of playback circuit 42, preferably this fixed period of time is equal to about ¼ the interval between horizontal sync pulses. Accordingly, positive directed rectangular waves or pulses are thereby produced at collector 47*c* of transistor 47*a*, the leading edges thereof are triggered at the leading edges of the sync signal on line 42′, and the trailing edges thereof occur about a ¼ horizontal sync interval thereafter. These output pulses appear on lines 47′ and 47″ connected to collector 47*c*.

Referring now to FIG. 4*c*, there is seen a schematic circuit diagram of a frame rate former 48 that may be used in switch processing system 44 shown in block form in FIG. 1. Frame rate former 48 is seen to include a first integrator including resistor 48*a*′ and capacitor 48*a*″ followed by a second integrator including resistor 48$b'$ and capacitor 48$b''$, coupled to a clipper amplifier stage 48$c$ including transistor 48$c'$ feeding into an inverter amplifier stage 48$d$ including transistor 48$d'$. In addition, the output of transistor 48$d'$ is applied to a one shot multivibrator circuit 48$e$ including transistors 48$e'$ and 48$e''$ with a pulse shaping circuit 48$f$ including transistor 48$f'$. This one shot multivibrator circuit 48$e$ is then followed by an isolation amplifier 48$g$ including transistor 48$g'$. The positive directed stripped sync pulses from sync stripper 46 appearing on line 46' is applied to the first and second integrators to integrate its vertical pulses which are then applied to clipper amplifier 48$c$ which amplifies and passes the top portions of the integrated vertical sync pulses. Thereafter, inverter amplifier 48$d$ is coupled to clipper amplifier 48$c$ to invert and amplify its output to be then differentiated by capacitor 48$h'$ and resistors 48$h''$ and 48$h'''$ to develop positive directed pulses at the trailing edges of the top portions of the integrated vertical sync pulses. The positive directed pulses appearing across resistor 48$h'''$ pass through diode 48$i$ to be applied as triggering pulses to the base of transistor 48$e'$ of one shot multivibrator circuit 48$e$.

In multivibrator circuit 48$e$, transistor 48$e'$ is normally non-conducting and transistor 48$e''$ is normally conducting, so that a positive trigger pulse applied to the base of transistor 43$e'$ will reverse its conducting states for a period of time determined by capacitor 48$j$ and resistor 48$j'$. Otherwise, except for the addition of pulse shaping circuit 48$f$, multivibrator circuit 48$e$ is seen to be similar to that shown in FIG. 4$b$. At the time that the triggered multivibrator circuit 48$e$ reverts to its normal state and transistor 48$e''$ starts to conduct, transistor 48$f'$ of pulse shaping circuit 48$f$ is fired connecting capacitor 48$j$ to the +12 volt D.C. line for fast charging thereof, thereby sharpening the corresponding edges of the rectangular wave on the collector of transistor 48$e''$. In operation, multivibrator 48$e$ is triggered by the positive directed pulses appearing across resistor 48$h'''$. The duration of the cycle of operation of multivibrator circuit 48$e$ is set for a period of time which is less than a frame interval but more than a field interval. At the end of its cycle of operation, multivibrator circuit 48$e$ reverts to its normal state and transistor 48$e''$ starts to conduct. Thereafter, multivibrator circuit 48$e$ is again fired at the next occurring vertical sync pulse to repeat its cycle. As a result, a positive directed rectangular waveform appears on the collector of transistor 48$e''$ which starts at every other sync pulse. The signal output on the collector of transistor 48$e''$ is then differentiated by capacitor 48$k$ and resistor 48$k'$ to provide positive and negative pulses at the leading edges and trailing edges thereof respectively, which pass through isolation amplifier 48$g$ and appear on line 48'. It is to be noted that the negative pulses on line 48' occur at the frame rate of the signal appearing on line 42', and these frame rate negative pulses on line 48' are shown in FIG. 7 as waveform A thereof.

Referring now to FIG. 4$d$, there is seen a schematic circuit diagram of the reference circuit 51 shown in block form in FIG. 1. Reference circuit 51 is seen to include a first monostable multivibrator circuit 61 including normally conducting transistor 61$a$ and normally non-conducting transistor 61$b$. The collectors of transistors 61$a$ and 61$b$ are connected to a +12 volt D.C. line through load resistors 61$c$ and 61$d$ respectively. The emitters of transistors 61$a$ and 61$b$ are both grounded. Resistor 61$e$ connects the collector of transistor 61$a$ to the base of transistor 61$b$, and capacitor 61$f$ connects the collector of transistor 61$b$ to the base of transistor 61$a$. Resistor 61$g$ connects a −12 volt D.C. line to the base of transistor 61$b$ to prevent leakage current during its off state. The negative frame rate pulses appearing on line 48''' pass through diode 61$h$ to trigger off transistor 61$a$ and therefore cause transistor 61$b$ to conduct. Each of these frame rate pulses occur during alternate vertical blanking intervals at time $t_1$ as seen in FIG. 2$a$. The values of resistor 61$i$ and capacitor 61$f$ are such that the cycle of operation of multivibrator circuit 61 continues until about time $t_2$ (seen in FIG. 2$a$) which occurs during the same vertical blanking period as does $t_1$. At time $t_2$, transistors 61$a$ and 61$b$ revert to their normal operating conditions. Consequently, the signal of waveform E of FIG. 7 is developed on line 61' taken from the collector of transistor 61$a$.

Reference circuit 51 of FIG. 4$d$ also shows a second monostable multivibrator circuit 71 including a normally conducting transistor 71$a$ and a normally non-conducting transistor 71$b$. The collector of transistor 71$a$ is connected to a +12 volt D.C. line through load resistor 71$c$, and the collector of transistor 71$b$ is connected to said +12 volt D.C. line through load resistor 71$d$ and through diode 71$e$ and charging resistor 71$f$. The emitters of transistors 71$a$ and 71$b$ are both grounded. Resistor 71$g$ connects the collector of transistor 71$a$ to the base of transistor 71$b$, and capacitor 71$h$ connects the base of transistor 71$a$ to the collector of transistor 71$b$ through diode 71$e$. Resistor 71$i$ connects a −12 volt D.C. line to the base of transistor 71$b$ to prevent leakage current during its off state. The signal of waveform E of FIG. 7 appearing on line 61' is differentiated by capacitor 71$j$ and resistor 71$k$ so that negative pulses at the trailing edges thereof pass through diode 71$m$ to trigger off transistor 71$a$ and cause transistor 71$b$ to conduct. The output signal from sync delay 47 appearing on line 47' is differentiated by capacitor 71$n$ and resistor 71$o$ so that negative pulses at the trailing edges thereof pass through diode 71$p$ to trigger off transistor 71$b$ and cause transistor 71$a$ to conduct. The value of resistor 71$q$ and capacitor 71$h$ are such that transistor 71$a$ is turned off by each of the negative pulses passing through diode 71$m$, and so that transistor 71$b$ is triggered off by the next occurring signal on line 47' prior to the end of the normal cycle of operation. The signal across resistor 71$o$ is connected by resistor 71$r$ to the collector of transistor 71$b$ by diode 71$s$, and to the +12 volt D.C. line by resistor 71$t$. When transistor 71$b$ is not conducting, a positive bias is present on capacitor 71$n$ at its junction with diode 71$p$, said positive bias discharges through resistor 71$r$, diode 71$s$, and transistor 71$b$ when transistor 71$b$ is caused to conduct. Until this positive bias on capacitor 71$n$ is sufficiently discharged, a triggering pulse on line 47' will be unable to turn off transistor 71$b$. In that event, the next pulse on line 47' will do so. As a result, circuit 71 will operate as aforesaid, even if a pulse on line 61' happens to closely coincide with a pulse on line 47'. Furthermore, when transistor 71$b$ is cut-off, diode 71$e$ isolates capacitor 71$h$ from the collector of transistor 71$b$ causing the rectangular pulses appearing on said collector to have sharp trailing edges. Consequently, the signals of waveform F. of FIG. 7 is developed on line 51' taken from the collector of transistor 71$b$ which has pulses initiated at the trailing edges of the pulses of waveform E and terminated at the trailing edges of the delayed sync signal from sync delay 47'. With respect to the trailing edges of each of the pulses of waveform E which occur at time $t_2$ seen in FIG. 2$a$, the trailing edges of each of the pulses of waveform F occur at time $t_3$ seen in FIG. 2$a$ during the same vertical blanking period. In addition, a signal which is the reverse of waveform F is taken from the collector of transistor 71$a$ and appears on line 51'''.

Referring now to FIG. 4$e$, there is seen a schematic circuit diagram of start actuator 52, start circuit 49, and erase timer 50 shown in block form in FIG. 1. Start actuator 52 includes a mechanical push button type switch 52$a$ having an arm 52$b$ normally contacting terminal 52$c$ connected to ground. When switch 52$a$ is actuated, arm 52$b$ is caused to contact terminal 52$d$ connected to a −12 volt D.C. line until switch 52$a$ is released whereby arm 52$b$ returns to contact terminal 52$c$. As a result, a rectangular pulse seen as waveform B of FIG. 7 is produced on line 52'.

Start circuit 49 of FIG. 4e shows a monostable multivibrator circuit having a normally conducting transistor 49a and a normally non-conducting transistor 49b, The collector of transistor 49a is connected to a +12 volt D.C. line through load resistor 49c, and the collector of transistor 49b is connected to said +12 volt D.C. line through load resistor 49d and through diode 49e and charging resistor 49f. The emitters of transistors 49a and 49b are both grounded. Resistor 49g connects the collector of transistor 49a to the base of transistor 49b, and capacitor 49h connects the base of transistor 49a to the collector of transistor 49b through diode 49e. Resistor 49i connects a −12 volt D.C. line to the base of transistor 49b to prevent leakage current during its off state. The pulse of waveform B of FIG. 7 appearing on line 52′ is differentiated by capacitor 49j and resistor 49k so that a negative directed pulse at the leading edge thereof passes through diode 49m to trigger off transistor 49a and cause transistor 49b to conduct. The output signal from frame rate former 48 appearing on line 48′ is differentiated by capacitor 49n and resistor 49o so that negative pulses at the trailing edges thereof pass through diode 49p to cause the next occurring pulse on line 48′ to trigger off transistor 49b and cause transistor 49a to conduct. The value of resistor 49q and capacitor 49h are such that the multivibrator circuit of start circuit 49 has a cycle of operation of a duration that slightly exceeds that of a frame interval. In addition, when transistor 49b is cut off, diode 49e electrically isolates the then charging capacitor 49h from the collector of transistor 49b causing the rectangular pulse appearing on said collector to have a sharp trailing edge. Consequently, the signal of waveform C of FIG. 7 is developed on line 49′ taken from the collector of transistor 49a, the signal of waveform C is a pulse initiated at the leading edge of the pulse of waveform B and terminated at the next occurring frame rate pulse from frame rate former 48. The corresponding inverted pulse of that shown in waveform C appears on line 49″ taken from the collector of transistor 49b.

Erase timer 50 of FIG. 4e shows another multivibrator circuit having a normally conducting transistor 50a and a normally non-conducting transistor 50b. The collector of transistor 50a is connected to a +12 volt D.C. line through load resistor 50c, and the collector of transistor 50b is connected to said +12 volt D.C. through load resistor 50d. The emitters of transistors 50a and 50b are grounded. Resistor 50g connects the collector of transistor 50a to the base of transistors 50b, and capacitor 50h connects the collector of transistor 50b to the base of transistor 50a. Resistor 50i connects a −12 volt D.C. line to the base of transistor 50b to prevent leakage current during its off state. The rectangular pulse of waveform C of FIG. 7 appearing on line 49′ is differentiated by capacitor 50j and resistor 50k so that a negative directed pulse at the trailing edge thereof passes through diode 50m to trigger off transistor 50a and cause transistor 50b to conduct. The output signal from frame rate former 48 appearing on line 48′ is differentiated by capacitor 50n and resistor 50o so that negative pulses at the trailing edges thereof pass through diode 50p to the base of transistor 50b in order to cause the next occurring pulse on line 48′ to trigger off transistor 50b and cause transistor 50a to conduct. The value of resistor 50q and capacitor 50h are such that the multivibrator circuit of erase timer 50 has a cycle of operation of a duration that slightly exceeds that of a frame interval. Consequently, the signal of waveform D of FIG. 7 is developed on line 44a, taken from the collector of transistor 50a. The signal of waveform D is a rectangular pulse initiated at the trailing edge of the pulse of waveform C (which occurs at a frame rate pulse) and terminated at the next occurring frame rate pulse from frame rate former 48.

Referring now to FIG. 4f, there is seen a schematic circuit diagram of erase driver 41 shown in block form in FIG. 1. The signal of waveform D appearing on line 44a is applied through coupling resistor 41a to the base of transistor 41b. Capacitor 41c across resistor 41a sharpens the leading and trailing edges of the pulse of waveform D. A storage capacitor 41d is charged to +12 volts through resistor 41e when transistor 41b is not conducting. During the positive rectangular pulse of waveform D, transistor 41b will conduct and allow storage capacitor 41d to discharge through resistors 41f and 41g. Also the erase current from storage capacitor 41d can pass through diode 41h via output line 41′ to go through the coil of erase head 30. Blocking diode 41h prevents transistor leakage current from passing through line 41′ when transistor 41b is not conducting. As the duration of discharge of capacitor 41d is very small, i.e. 1/30 of a second, capacitor 41d can be made sufficiently large so that the D.C. erase voltage on line 41′ remains essentially constant.

Referring now to FIG. 4g, there is seen a schematic circuit diagram of record timer 53 shown in block form in FIG. 1. Record timer 53 is a monostable multivibrator circuit having a normally conducting transistor 53a and a normally non-conducting transistor 53b. The collector of transistor 53a is connected to a −12 volt D.C. line through load resistor 53c, and the collector of transistor 53b is connected to said −12 volt D.C. line through load resistor 53d and through diode 53e and charging resistor 53f. The emitters of transistors 53a and 53b are grounded. Resistor 53g connects the collector of transistor 53a to the base of transistor 53b, and capacitor 53h connects the base of transistor 53a to the collector of transistor 53b through diode 53e. Resistor 53i connects a +12 volt D.C. line to the base of transistor 53b to prevent leakage current during its off state. The inverted pulse of that seen in waveform C of FIG. 7 appearing on line 49″ is differentiated by capacitor 53j and resistor 53k so that a positive pulse at the trailing edge thereof passes through diode 53m to trigger off transistor 53a and turn on transistor 53b. The output signal from reference timer 51 appearing on line 51″ is differentiated by capacitor 53n and resistor 53o so that positive pulses at the trailing edges thereof pass through diode 53p to be used for triggering off transistor 53b. Also, the output signal on line 51″ is delayed by resistor 53o and capacitor 53s and applied through resistor 53r to the collector of transistor 53b, so that the next occurring pulse on line 51″ will not turn off transistor 53b. As a result the second occurring pulse on line 51″ turns off transistor 53b causing transistor 53a to be conducting. In addition, when transistor 53b is cut-off, diode 53e electrically isolates the then charging capacitor 53h from the collector of transistor 53b causing the rectangular pulse appearing on said collector to have a sharp trailing edge. Consequently, the signal of waveform G of FIG. 7 is developed on line 53′ taken from the collector of transistor 53b. The values of resistor 53q and capacitor 53h are such that the multivibrator circuit of record timer 53 has a cycle of operation of a duration slightly exceeding the rectangular pulse of waveform G. The signal of waveform G is a rectangular pulse initiated at the trailing edge of the pulse of waveform C and terminated at the second thereafter occurring reference pulse from reference circuit 51.

Referring now to FIG. 4h, there is seen therein a schematic circuit diagram of a gating circuit that may be used in record driver 34 shown in block form in FIG. 1. Record driver 34 is seen to include an amplifier 34a, an intermediate gating circuit 34b, and a power driver 34c. The modulated television signal from record circuit 33 is applied by line 35′ as an input to amplifier 34a which in turn feed out of phase signals through transformer 34d to the base of transistor 34e and to the base of transistor 34f. The collectors of transistors 34e and 34f are respectively coupled through capacitors 34g and 34h to a push-pull power driver 34c. The collectors of transistors 34e and 34f connect to a +12 volt D.C. line through load coils 34i and 34j respectively, and its emitters connect to a —12 volt D.C. line through resistors 34k and 34m respectively. Line 44b connects to the center tap of the winding of transformer 34d that connects to each base of transistors 34e and 34f. Line 44b is connected to line 53'. The voltage on lines 53' is —12 volts except during the interval of the pulse of waveform G of FIG. 7 during which the voltage on line 53' is near zero. With —12 volts on line 53', (and therefore also on line 44b) transistors 34e and 34f will not conduct and therefore will not pass the output of amplifier 34a to power driver 34c. Accordingly, record driver 34 is then normally blocked. During the existence of the pulse of waveform G of FIG. 7, transistors 34e and 34f will conduct thereby allowing the output of amplifier 34a to pass through gating circuit 34b and applied to power driver 34c. The output of power driver 34c appears on line 34'.

Referring now to FIG. 4*i*, there is seen therein a schematic circuit diagram of stop actuator 56, stop circuit 55, and changeover circuit 57 shown in block form in FIG. 1. Stop actuator 56 is seen to be similar to start actuator 52 and includes a mechanical push button type switch 56a having an arm 56b normally contacting terminal 56c connected to ground. When switch 56a is actuated, arm 56b is caused to contact terminal 56d connected to a +12 volt D.C. line until switch 56a is released whereby arm 56b returns to contact terminal 56c. As a result, a rectangular pulse seen as waveform L of FIG. 7 is produced on line 56'.

Stop circuit 55 of FIG. 4*i* shows another multivibrator circuit having a normally conducting transistor 55a and a normally non-conducting transistor 55b. The collector of transistor 55a is connected to a +12 volt D.C. line through load resistor 55c, and the collector of transistor 55b is connected to said +12 volt D.C. through load resistor 55d. The emitters of transistors 55a and 55b are grounded. Resistor 55g connects the collector of transistor 55a to the base of transistor 55b, and capacitor 55h connects the collector of transistor 55b to the base of transistor 55a. Resistor 55i connects a —12 volt D.C. line to the base of transistor 55b to prevent leakage current during its off state. The rectangular pulse of waveform L of FIG. 7 appearing on line 56' is differentiated by capacitor 55j and resistor 55k so that a negative directed pulse at the trailing edge thereof passes through diode 55m to trigger off transistor 55a and cause transistor 55b to conduct. The output signal from reference circuit 51 appearing on line 51''' is differentiated by capacitor 55n and resistor 55o so that negative pulses at the trailing edges thereof pass through diode 55p to the base of transistor 55b in order to cause the next occurring pulse on line 51''' to trigger off transistor 55b and cause transistor 55a to conduct. The value of resistor 55q and capacitor 55h are such that the multivibrator circuit of stop circuit 55 has a cycle of operation of a duration that slightly exceeds that of a frame interval. Consequently, the signal of waveform N of FIG. 7 is developed on line 55' taken from the collector of transistor 55a. The signal of waveform N is a rectangular pulse initiated at the trailing edge of the pulse of waveform L and terminated at the next occurring pulse from reference circuit 51.

Changeover circuit 57 of FIG. 4*i* shows a bistable multivibrator circuit including transistors 57a and 57b, wherein applied negative trigger pulses can reverse the conduction and non-conduction states of the transistors. The collectors of transistors 57a and 57b are connected to a +12 volt D.C. line through load resistors 57c and 57d respectively. The emitters of transistors 57a and 57b are grounded. Resistor 57e connects the collector of transistor 57a to the base of transistor 57b, and resistor 57f connects the collector of transistor 57b to the base of transistor 57a. Capacitors 57g and 57g' across resistors 57e and 57f respectively sharpen the voltage pulses coupled through these resistors. Resistors 57h and 57h' connect a —12 volt D.C. line to the base of transistor 57b and to the base of transistor 57a respectively in order to prevent leakage current during their off states. The rectangular pulse of waveform N of FIG. 7 appearing on line 55' is differentiated by capacitor 57i and resistor 57j so that a negative directed pulse at the trailing edge thereof passes through diode 57k to trigger off transistor 57b and cause transistor 57a to conduct. The output signal from record timer 53 appearing on line 53' is differentiated by capacitor 57m and resistor 57n so that a negative directed pulse at the trailing edge thereof passes through diode 57o to trigger off transistor 57a and cause transistor 57b to conduct. Consequently, the rectangular pulse of waveform H of FIG. 7 is developed on lines 57' and 57'' taken from the collector of transistor 57a. The pulse of waveform H is initiated at the trailing edge of the pulse of waveform G and is terminated at the trailing edge of the pulse of waveform N.

FIG. 4*j* is a schematic circuit diagram of bridge keyer 58 shown in block form in FIG. 1. Bridge switches S1 and S2 as hereinafter described operate more effectively with applied voltages of plus and minus 12 volts. The signal of waveform H on line 57' from changeover circuit 57 ranges from +12 volts D.C. to about zero volts. Bridge keyer 58 converts the voltage range of changeover circuit 57 for so operating switches S1 and S2. As seen in FIG. 4*j*, bridge keyer 58 receives the signal on line 57' which is applied to transistor stage 58a connected to transistor stage 58b, the latter is connected to a symmetrical emitter follower stage 58c having an output on line 44f of either —12 volts or +12 volts. Transistor stage 58b is also coupled through resistor 58d to phase inverter 58e which is connected to another symmetrical emitter follower stage 58f having an output on line 44e which is either —12 volts or +12 volts D.C. When the voltage on input line 57' is near zero volts, then the voltages on lines 44e and 44f are +12 volts and —12 volts respectively. When the voltage on input line 57' is +12 volts, then the voltages on lines 44e and 44f are —12 volts and +12 volts respectively.

Referring now to FIG. 4*k*, there is seen therein a schematic circuit diagram of bridge switches S1 and S2 seen in FIG. 1. Line 44e from bridge keyer 58 connects to terminal S', and line 44f from bridge keyer 58 connects to terminal S''. Bridge switch S1 includes four diodes 59a, 59b, 59c, and 59d connected to form a bridge. In bridge switch S1, a first voltage dropping resistor 59e connects terminal S' to terminal 59f, a second voltage dropping resistor 59g connects terminal S'' to terminal 59h, a coupling capacitor 59i connects line 33' to terminal 59j, and another coupling capacitor 59k connects terminal 59m to line 37'. Bridge switch S2 includes four diodes 60a, 60b, 60c, and 60d connected to form a bridge in which its diodes are reversed in polarity from those in S1. In bridge switch S2, a first voltage dropping resistor 60e connects terminal S' to terminal 60f, a second voltage dropping resistor 60g connects terminal S'' to terminal 60h, a coupling capacitor 60i connects line 37' to terminal 60j, and another coupling capacitor 60k connects terminal 60m to line 39'.

During the existence of the rectangular pulse of waveform H of FIG. 7, bridge keyer 58 will cause —12 volts to be on line 44e and +12 volts to be on line 44f. In that event, since terminal S' is then negative with respect to terminal S'', diodes 59a, 59b, 59c, and 59d of bridge switch S1 will not conduct, and diodes 60a, 60b, 60c, and 60d of bridge switch S2 will conduct. During this period, bridge switch S1 will be open as the signal appearing on line 33' will not be able to pass through to line 37', and bridge switch S2 will be closed as the signal appearing on line 39' will be able to pass through to line 37'. At all other times, as bridge keyer 58 will cause +12 volts to be on line 44e and —12 volts to be on line 44f, bridge S1 will be closed and bridge switch S2 will be open.

As seen in FIG. 5, playback timer 54 includes an and gate 62, a counter 63, a first timer 64, and a second timer 65. Lines 57″ and 51′ connect to and gate 62 which connects to first timer 64 by line 62′. Counter 63 connects to first timer 64 by line 63′. From first timer 64, line 64′ connects to counter 63, and line 64″ connects to second timer 65. Line 47″ from sync delay 47 also connects to counter 63. In addition, FIG. 5 shows clamp generator 45 to include an or circuit 66, clamp timer 67, and clamp driver 68. Line 44*g* connected to or circuit 66 connects to line 44*c* which in turn connects to line 64′. Line 44*h* connected to or circuit 66 connects to line 44*d* which in turn is connected to second timer 65. Line 44*i* connected to or circuit 66 is also connected to second timer 65. The output of or circuit 66 on line 66′ is fed into clamp timer 67 which is connected to clamp driver 68 by line 67′. Finally, line 45′ connects clamp driver 68 to line 42″ in playback circuit 42.

Referring now to FIG. 6*a*, there is seen therein a schematic circuit diagram of counter 63 shown in block form in FIG. 5. Counter 63 is seen to include four unijunction transistors 63*a*, 63*b*, 63*c*, and 63*d* connected to operate as relaxation oscillators. Counter 63 is activated when the base of input transistor 63*e* is biased causing it to conduct, and the +12 volts D.C. on line 63*f* will pass through transistor 63*e* and appear on voltage supply line 63*g*. Thereupon, charging capacitor 63*a*′ will charge through resistor 63*a*″, charging capacitor 63*b*′ will charge through resistor 63*b*″, charging capacitor 63*c*′ will charge through resistor 63*c*″, and charging capacitor 63*d*′ will charge through resistor 63*d*″. Each unijunction transistor will thereafter be fired when its associated charging capacitor reaches the firing potential of the unijunction transistor, which may for example be about −6 volts. At the time that each unijunction transistor is fired, its emitter becomes forward biased discharging its charging capacitor through its emitter until the extinguishing potential of the unijunction transistor is reached, whereupon its emitter ceases to conduct. Thereafter, the aforestated cycle of operation of each unijunction transistor oscillator is repeated. As also seen in FIG. 6*a*, the pulses of sync delay 47 on line 47″ are coupled through capacitor 63*h* to the second base of unijunction transistor 63*a*. When counter 63 is activated by +12 volts appearing on voltage supply line 63*g*, the pulses on line 47″ will cause unijunction transistor 63*a* to fire at every other pulse developed from sync delay 47. The resulting sawtooth pulse across charging capacitor 63*a*′ is then fed through coupling capacitor 63*i* to the second base of unijunction transistor 63*b* to cause it to fire at every fifth sawtooth pulse. The resulting sawtooth pulse across charging capacitor 63*b*′ is fed through coupling capacitor 63*j* to the second base of unijunction transistor 63*c* to cause it to fire at every fifth sawtooth pulse. Also, the resulting sawtooth pulse across charging capacitor 63*c*′ is fed through coupling capacitor 63*k* to the second base of unijunction transistor 63*d* to cause it to fire at every fifth sawtooth pulse. The sawtooth pulse across charging capacitor 63*d*′ is differentiated by capacitor 63*m* and resistor 63*n* to produce a sharp positive pulse at the output of amplifier transistor 63*o* on line 63′. As a result, the output pulse on line 63′ occurs 250 horizontal line intervals after counter 63 has been activated when transistor 63*e* is caused to conduct.

Referring now to FIG. 6*b*, there is seen therein a schematic circuit diagram of and gate 62 and first timer 64 shown in block form in FIG. 5. And gate 62 includes a +12 volt D.C. line connected through voltage dropping resistor 62*a* to diodes 62*b* and 62*c*. During the existence of the rectangular pulse of waveform H on line 57″, the pulses from reference circuit 51 on line 51′ pass through diode 62*c* and appear on line 62′.

First timer 64 of FIG. 6*b* shows a monostable multivibrator circuit having a normally conducting transistor 64*a* and a normally non-conductive transistor 64*b*. The collector of transistor 64*a* is connected to a −12 volt D.C. line through load resistors 64*c*, and the collector of transistor 64*b* is connected to said −12 volt D.C. line through load resistor 64*d* and through diode 64*e* and charging resistor 64*f*. The emitters of transistors 64*a* and 64*b* are both grounded. Resistor 64*g* connects the collector of transistor 64*a* to the base of transistor 64*b*, and capacitor 64*h* connects the base of transistor 64*a* to the collector of transistor 64*b* through diode 64*e*. Resistor 64*i* connects a +12 volt D.C. line to the base of transistor 64*b* to prevent leakage current during its off state. The pulses appearing on line 62′ are differentiated by capacitor 64*j* and resistor 64*k* so that positive pulses at the trailing edge thereof passes through diode 64*m* to trigger off transistor 64*a* and cause transistor 49*b* to be turned off. The output signal from counter 63 appearing on line 63′ is differentiated by capacitor 64*n* and resistor 64*o* so that positive pulses at the leading edges thereof pass through diode 64*p* to trigger off transistor 64*b* and cause transistor 64*a* to be turned on. The value of resistor 64*q* and capacitor 64*h* are such that the multivibrator circuit of first timer 64 may have a cycle of operation of a duration that slightly exceeds that of a field interval. In addition, when transistor 64*b* is cut-off, diode 64*e* electrically isolates the then charging capacitor 64*h* from the collector of transistor 64*b* causing the rectangular pulse appearing on said collector to have a sharp trailing edge. It will also be noted that the collector of transistor 64*b* is connected to line 64′ which connects to the base of transistor 63*e* of counter 63. As the collector of transistor 64*b* is normally non-conducting, the voltage on line 64′ is then −12 volts which prevents transistor 63*e* from conducting. When transistor 64*b* is in the conducting state, then the voltage on line 64′ is then about zero which allows transistor 63 of counter 63 to conduct. Thereupon, 250 horizontal sync intervals thereafter, counter 63 produces a triggering pulse on line 63′ turning off transistor 64*b* and causing transistor 64*a* to conduct. Consequently, the signal of waveform I of FIG. 7 is developed on line 64′ taken from the collector of transistor 64*b*. The signal of waveform I contains pulses initiated at the trailing edges of the pulses of the signal of waveform F and terminated 250 horizontal sync intervals later.

Second timer 65 of FIG. 6*c* shows a monostable multivibrator circuit having a normally conducting transistor 65*a* and a normally non-conducting transistor 65*b*. The collector of transistor 65*a* is connected to a −12 volt D.C. line through load resistor 65*c*, and the collector of transistor 65*b* is connected to said −12 volt D.C. line through load resistor 65*d* and through diode 65*e* and charging resistor 65*f*. The emitters of transistors 65*a* and 65*b* are both grounded. Resistor 65*g* connects the collector of transistor 65*a* to the base of transistor 65*b*, and capacitor 65*h* connects the base of transistor 65*a* to the collector of transistor 65*b* through diode 65*e*. Resistor 65*i* connects a +12 volt D.C. line to the base of transistor 65*b* to prevent leakage current during its off state. The inverted pulses of waveform I of FIG. 7 taken from the collector of transistor 65*a* appearing on line 64″ are differentiated by capacitor 65*j* and resistor 65*k* so that positive pulses at the trailing edges thereof passes through diode 65*m* to trigger off transistor 65*a* and cause transistor 65*b* to turn on. The output signal from reference circuit 51 appearing on line 51′ is differentiated by capacitor 65*n* and resistor 65*o* so that positive pulses at the trailing edges thereof pass through diode 65*p* to trigger off transistor 65*b* and turn on transistor 65*a*. The value of resistor 65*q* and capacitor 65*h* are such that the multivibrator circuit of second timer 65 has a cycle of operation of a duration that slightly exceeds that of the interval between pulses shown in waveform I. In addition, when transistor 65*b* is cut-off, diode 65*e* electrically isolates the then charging capacitor 65*h* from the collector of transistor 65*b* causing the rectangular pulse appearing on said collector to have a sharp trailing edge. Consequently, the signal of waveform J of FIG. 7 is developed on line 44*d* taken from the collector of transistor 65*b*. The signal of waveform J are pulses initiated at the trailing edges of the pulse of waveform I and terminated at the leading edges of the pulse of waveform I.

Referring now to FIG. 6*d*, there is shown therein a schematic circuit diagram of playback switch 38 shown in block form in FIG. 1. Playback switch 38 includes gating transistors 38*a* and 38*b* connected to operate as switches. The collectors of transistors 38*a* and 38*b* are connected to each other and to a −12 volt D.C. line through resistor 38*c*. The base of transistor 38*a* and the base of transistor 38*b* connect to said −12 volt D.C. line through resistors 38*d* and 38*e* respectively. Capacitor 38*f* couples the signal on line 28*a*′ from transducer unit 28*a* to the base of transistor 38*b*, and capacitor 38*g* couples the signal on line 28*b*′ from transducer unit 28*b* to the base of transistor 38*a*. The pulses from first timer 64 appearing on line 44*c* and seen in waveform I of FIG. 7 are applied to the emitter of transistor 38*b* through resistor 38*h*. The pulses from second timer 65 appearing on line 44*d* and seen in waveform J of FIG. 7 are applied to the emitter of transistor 38*a* through resistor 38*i*. The pulses of waveform I provide forward bias for transistor 38*b* allowing it to conduct, and the pulse of waveform J provide forward bias for transistor 38*a* allowing it to conduct. Consequently, transistor 38*b* will allow the signal on line 28*a*′ to pass through to line 38′ only during the existence of the pulses of waveform I, and transistor 38*a* will allow the signal on line 28*b*′ to pass through to line 38′ only during the existence of the pulses of waveform J.

Referring now to FIG. 6*e*, there is shown therein a schematic circuit diagram of or circuit 66, clamp timer 67, and clamp driver 68 shown in block form in FIG. 5. In or circuit 66, the output signal on line 44*c*, from first timer 64 is applied by line 44*g* to be differentiated by capacitor 66*a* and resistor 66*b* to produce positive pulses at the leading edges of said signal which pass through diode 66*c* to line 66′. Also, the output signal on line 44*d* from second timer 65 is applied by line 44*h* to be differentiated by capacitor 66*d* and resistor 66*e* to produce positive pulses at the leading edges of said signal which pass through diode 66*f* to line 66′. In addition, the output signal on line 44*i* from second timer 65 is differentiated by capacitor 66*g* and resistor 66*h* to produce positive pulses at the trailing edges of said signal which pass through diode 66*i*. Consequently, sharp positive pulses occurring at the beginning and ends of all rectangular pulses of waveforms I and J of FIG. 7 appear on line 66′ and are applied to clamp timer 67.

Clamp timer 67 of FIG. 6*e* is seen to be a monostable multivibrator circuit including normally conducting transistor 67*a* and normally non-conducting transistor 67*b*. The collectors of transistors 67*a* and 67*b* are connected to a −12 volt D.C. line through load resistors 67*c* and 67*d* respectively. The emitters of transistors 67*a* and 67*b* are both grounded. Resistor 67*e* connects the collector of transistor 67*a* to the base of transistor 67*b*, and capacitor 67*f* connects the collector of transistor 67*b* to the base of transistor 67*a*. Resistor 67*g* connects a +12 volt D.C. line to the base of transistor 67*b* to prevent leakage current during its off state. The pulses on line 66′ are differentiated by capacitor 67*h* and resistor 67*i* so that positive pulses at the leading edges thereof pass through diode 67*j* to trigger off transistor 67*a* and turn on transistor 67*b*. The values of resistor 67*k* and capacitor 67*f* determines the cycle of operation of this multivibrator. Clamp timer 67 produces timing pulses during which a clamp blanking signal is developed to blank out any switching transients resulting from the switching operations described herein. The developed clamp blanking signal should preferably not interfere with any sync pulses in the signal applied to playback circuit 42. From the foregoing description, it will be realized that playback timer 34 switches on and off at the times of the trailing edges of the pulses appearing on line 66′. For these reasons, the duration of the said cycle of operation of the multivibrator circuit of clamp timer 67 is preferably made to be about twice the duration of each pulse appearing on line 66′. Consequently, the timing pulses developed on line 67′ taken from the collector of transistor 67*b* are initiated at the leading edges of the pulses on line 66′ and terminated at a fraction of a horizontal line interval thereafter, so as not to interfere with any sync pulses in the signal applied to playback timer 42, and to have a duration to cover the existence of switching transients developed in the signal applied to playback circuit 42.

Clamp driver 68 of FIG. 6*e* is seen to include a transistor 68*a* and a conventional diode gating circuit 68*b*. The timing pulses developed on line 67′ are applied to transistor 68*a* to produce oppositely phased coupled to diode bridge 68*b* by capacitors 68*c* and 68*d* respectively. During the existence of these timing pulses, diode bridge 68*b* allows the D.C. voltage on arm 68*e* of potentiometer 68*f* to pass therethrough to line 45′. The voltage on arm 68*e* of potentiometer 68*f* is set to equal the blanking level of the video signal on line 42″ between amplifiers in playback circuit 42. As a result, clamp blanking pulses are produced on line 45′ during the existence of the timing pulses on line 67′ from clamp timer 67. These clamp blanking pulses are applied to line 42″ in playback circuit 42 to prevent variations from the normal blanking level of the video signal during their existence, thereby eliminating switching transients.

In operation, switch processing system 44 provides several timing signals synchronized with the sync pulses in the signal output of playback circuit 42 appearing on line 42′ in order to selectively switch the operating modes of the described single picture reproducer apparatus in a predetermined manner from standby, to record, then to playback, and thereafter back to standby, as hereinabove described. During the playback mode of operation, its playback timer 54 produces a first and second series of playback timing signals which enable a single picture signal to be developed from a recorded portion of the video signal that is reproduced by storage device 12, said single picture signal having continuous frames with the sync pulses of the video signal and with the picture information of a single field of said portion of the video signal in each field thereof. The timing signals developed by switch processing system 44 are caused to occur at predetermined times so as not to interrupt the continuity of the signal output of playback circuit 42, and without disturbing any sync pulses in said signal output.

In switch processing system 44, sync stripper 46 receives the signal on line 42′ to separate the sync pulses from the picture information therefrom. These sync pulses include the horizontal sync pulses, the serrated vertical sync pulses, and the equalizing pulses. The sync pulses are applied to frame rate former 48 to develop frame rate pulses seen in waveform A of FIG. 7 from every other serrated vertical sync pulse. These frame rate pulses occur at time $t_1$, seen in FIG. 2*a* during the vertical blanking period of the signal on line 42′.

At any desired time during the said standby mode of operation, start actuator 52 and start circuit 49 comprising the start means can be caused to produce a starting signal for changing the operating state of the single picture reproducer apparatus from standby to record. In start actuator 52, arm 52*c* can then be moved to temporarily contact terminal 52*d* to produce the pulse seen in waveform B of FIG. 7 and to initiate the pulse of waveform C of FIG. 7 developed by start circuit 49. The frame rate pulses of waveform A are applied to start circuit 49 so that the next occurring frame rate pulse of waveform A terminates the pulse of waveform C. The trailing edge of the pulse of waveform C is the starting signal of said start means. The pulse of waveform C is applied to erase timer 50 to initiate the pulse seen in waveform D of FIG. 7. The frame rate pulses of waveform A are applied to erase timer 50 to terminate the pulse of waveform D. The pulse of waveform D is the erase actuating signal which is applied by line 44a to erase driver 41. During the existence of this erase actuating signal, erase driver 41 develops an erase signal which is applied to erase head 30 in storage device 12 to erase any prerecorded signal on track 32 on storage member 16.

The sync pulses separated from the signal on line 42' are also applied to sync delay 47 which develop pulses, each of which start at each of the sync pulses from sync stripper 46 and has a duration so that its trailing edge occurs in between it and the next occurring sync pulse. Reference circuit 51 receives the frame rate pulses of waveform A to first develop the signal of waveform E seen in FIG. 7. The signal of waveform E includes pulses, each of which is initiated by the trailing edge of a frame rate pulse occurring at time $t_1$ seen in FIG. 2*a*, and is terminated within the same vertical blanking period at time $t_2$ seen in FIG. 2*a*. Reference circuit 51 also receives the sync pulses from sync delay 47 to produce the pulses of waveform F, each of which is initiated by the trailing edge of a pulse of waveform E and is terminated by the trailing edge of the next occurring sync pulse from sync delay 47. The trailing edges of the pulses of waveform F are the frame reference signals which occur in between vertical sync pulses and their subsequent picture information and in between horizontal sync pulses. From the above it will be realized that sync stripper 46, sync delay 47, frame rate former 48, and reference circuit 51 coact with each other to form the sync reference means for developing the frame reference signals of waveform F.

Record timer 53 receives the pulse of waveform C and the signal of waveform F to produce the pulse of waveform G which times the recording of a portion of the video signal developed from video signal source 10. The pulse of waveform G is initiated by the trailing edge of waveform C and terminated by the trailing edge of the second next occurring pulse of waveform F. The pulse of waveform G is the unblocking signal for record driver 34 which applies a bias thereto allowing the passage of a signal from line 35' to line 34'. It will be realized that record driver 34 acts as a record operation switch responsive to the pulse of waveform G to be opened, in addition to preparing the video signal for recordation. As a result, during the existence of the pulse of waveform G, a complete frame of a video signal is applied to transducer unit 28a which records said frame on circular track 32 on storage member 16 in storage device 12. In the meantime, as erase head 30 is slightly in advance of transducer unit 28a in the direction of rotation of storage member 16 as seen in FIG. 3*a*, erase head 30 will erase any previously recorded signals from track 32 prior to said recording. At the termination of the pulse of waveform G, the record mode of operation is completed and the playback mode of operation is started.

In order to initiate the playback mode of operation, in response to the trailing edge of the pulse of waveform G changeover circuit starts a changeover signal seen as waveform H of FIG. 7. This changeover signal is converted by bridge keyer 58 to provide appropriate voltages to respectively open and close bridge switches S1 and S2 during the playback mode of operation. As a result, playback circuit 42 will now receive the signals reproduced by transducer units 28a and 28b in storage device 12. In addition, the changeover signal of waveform H is applied to playback timer 54 to start alternate series of playback switching signals seen in waveform I and J of FIG. 7. Switch S1 is also herein called the standby operation switch as S1 connects video signal source 10 with playback circuit 42 during the standby state of operation. Switch S2 is also herein called the playback operation switch as switch S2 connects the reproduced signals from storage device 12 with playback circuit 42 during the playback state of operation.

In playback timer 54, first timer 64 in response to the trailing edges of the frame reference signals of waveform F starts each one of the series of playback timing signals seen in waveform I of FIG. 7. After an integer multiple of horizontal sync intervals after the start of each of said playback timing signals, in this case 250 horizontal sync intervals later, counter 63 terminates each of the said playback timing signals. The series of playback timing signals seen in waveform I are applied to playback switch 38 to connect line 28a' with line 38' during these intervals. At alternate times, second timer 65 in response to the trailing edges of the playback timing signals of waveform I starts another series of playback timing signals which are terminated by the trailing edges of the next occurring frame reference signals of waveform F. This alternate series of playback timing signals developed by second timer 65 is seen in waveform J of FIG. 7 and are applied to playback switch 38 to connect line 28b' with line 38' during their intervals.

In storage device 12, transducer units 28a and 28b scan circular track 32 on storage member 16 in synchronization with the frame rate of the composite video signal produced by video signal source 10. With reference to the recorded signal on circular track 32, transducer unit 28a will be at point $P_1$ seen in FIG. 2*a* at the start of each playback timing signal of waveform I, and transducer unit 28a will be at point $P_2$ seen in FIG. 2*b* at the end of each playback timing signal of waveform I. On the other hand, transducer unit 28b will be at point $P_3$ in FIG. 2*a* at the start of each playback timing signal of waveform J, and transducer unit 28b will be at point $P_4$ seen in FIG. 2*b* at the end of each playback timing signal of waveform J. Points $P_3$ and $P_1$ are seen to be displaced a one-half horizontal sync interval with respect to points $P_2$ and $P_4$ respectively, which occurs because transducer unit 28b is positioned at angle Y with respect to diameter line 29 as seen in FIG. 3*a* to cause a one-half horizontal sync displacement of their reproduced signals. Because of said displacement of transducer unit 28b, the combined sync pulses of both transducer units 28a and 28b will duplicate those of the composite video signal.

It will be realized that said angle Y could be such that an integer multiple of a one-half horizontal sync interval displacement occurs as long as points $P_1$ through $P_4$ occur prior to and after the vertical sync pulses as described, and do not undesirably interfere with picture information. In addition, it will be noted that points $P_1$ and $P_4$ are determined by the signals of waveforms E and F, and that points $P_2$ and $P_3$ are determined by the duration of each pulse of waveform I. The locations of points $P_1$ through $P_4$ are to occur prior to and after the vertical sync pulses as described, but should not undesirably interfere with picture information. It will be further noted that since the trailing edges of the signal of waveform F occurs in between horizontal sync pulses at a time developed by sync delay 47 and since counter 63 produces a termination pulse occurring an integer multiple of a horizontal sync interval thereafter, points $P_2$ of FIG. 2*b* and $P_3$ of FIG. 2*a* will occur in between equalizing pulses as shown. It will also be realized that said points $P_2$ and $P_3$ can be changed to occur during their preceding last line of picture information which is usually not observed on a television receiver in order to provide more time for clamping out switching transients.

The playback timing signals of waveforms I and J are applied to playback switch 38 to alternately combine a portion of a frame of a reproduced video signal including the picture information with vertical sync pulses of alternate fields, with a part of said portion without the vertical sync pulses. As a result, continuous frames of a single picture signal are developed on line 38' having the sync pulses of the video signal and the picture information of a single field.

During the playback mode of operation, the signals of waveforms I and J are also applied to clamp generator 45 to produce clamp actuating pulses seen in waveform K of FIG. 7 occurring at the beginnings and ends of the pulses of waveforms I and J in order to develop clamp blanking pulses. These clamp blanking pulses are applied to playback circuit 42 to eliminate switching transients during their existence.

As long as the changeover signal of waveform H continues, the described playback mode of operation continues. Then, at any desired time, stop actuator 56 and stop circuit 55 comprising the stop means can be caused to produce a stopping signal for changing the operating state of the single picture reproducer apparatus from playback to standby. In stop actuator 56, arm **56*b* can then be moved to temporarily contact terminal 56*d* to produce the pulse seen in waveform L of FIG. 7. The trailing edge of the pulse of waveform L thereupon initiates the pulse of waveform N. The frame reference signals of waveform F are applied to stop circuit 55 so that the next occurring frame reference pulse of waveform F terminates the pulse of waveform N. The trailing edge of the pulse of waveform N is the stopping signal of said stop means. The pulse of waveform N is applied to changeover circuit 57 to terminate the changeover signal of waveform H. As a result, bridge switches S1 and S2** will revert to being respectively closed and open as seen in FIG. 1, playback timer will then no longer be able to produce the playback switching signals of waveforms I and J, and the clamp actuating pulses of waveform K will also terminate. From now on the single picture reproducer apparatus reverts to the described standby state of operation until the start means is again actuated to repeat the described changeover in states of operation.

In the above description, a portion of a video or television signal was selectively recorded during a continuing moving picture signal, the recorded portion was thereupon reproduced to form a single picture signal which took the place of the moving picture signal until a selected time thereafter when the moving picture signal was continued. Thereafter, the process could be repeated for another selected portion of the moving picture signal. If instead of repeating said process with another portion of the moving picture signal, it is desired to again reproduce the prior recorded portion, then switches 36 and 40 seen in FIG. 1 would be opened. Then, record driver 34 and erase driver 41 would be disconnected from storage device 12. In that event, the prior recorded portion on track 32 on storage member 16 will not be erased and will be reproduced as aforedescribed whenever the start means is actuated until stopped by the stop means.

Having herein described the invention, what is claimed as new is:

1. An apparatus for developing a single picture signal from a composite moving picture video signal having picture information, horizontal sync pulses, and vertical sync pulses forming frames of alternate fields, said apparatus comprising:

a storage device for continuously reproducing a portion of a frame of the video signal recorded therein, said portion including the picture information of a single field and the vertical sync pulses of alternate fields, alternate reproduced portions being displaced to correspond their horizontal sync pulses with those of the video signal;

a playback switch connected to said storage device to combine the reproduced portions into a single picture signal;

a sync reference means connected to said playback switch to develop frame reference signals;

and a playback timer connected to said sync reference means and being responsive to the frame reference signals to produce playback timing signals, said playback switch being connected to said playback timer and being responsive to its playback timing signals to alternately combine said portion of the video signal with a part of said portion of the video signal without its vertical sync pulses in order to form continuous frames of a single picture signal having the sync pulses of the video signal and having the picture information of said single field in each field thereof.

2. An apparatus for developing a single picture signal from a composite moving picture video signal having picture information, horizontal sync pulses, and vertical sync pulses forming frames of alternate fields, said apparatus comprising:

a storage device including a plurality of transducer units to scan a storage member along a track thereon to reproduce a portion of a video signal recorded thereon, said portion including picture information of a single field and vertical sync pulses of alternate fields, each transducer unit being positioned to develop horizontal sync pulses corresponding to those of the video signal;

a playback switch connected to said transducer units to combine their reproduced signals into a single picture signal;

a sync reference means connected to said playback switch to develop frame reference signals;

and a playback timer connected to said sync reference means and being responsive to said frame reference signals to produce playback timing signals, said playback switch being connected to said playback timer and being responsive to its playback timing signals to alternately combine the portion of the video signal reproduced by one transducer unit with a part of the portion of the video signal reproduced by another transducer unit to form a single picture signal having the picture information of said portion of the video signal in each field thereof.

3. An apparatus for developing a single picture signal from a composite moving picture video signal having picture information, horizontal sync pulses, and vertical sync pulses forming frames of alternate fields, said apparatus comprising:

a storage device including a storage member and a pair of transducer units to scan the storage member along a circular track thereon to alternately reproduce a portion of a video signal recorded thereon, said portion including picture information of a single field and vertical sync pulses of alternate fields, each transducer unit being positioned to develop horizontal sync pulses corresponding to those of the video signal;

a playback switch connected to said transducer units to combine their reproduced signals into a single picture signal;

a sync reference means connected to said playback switch to develop frame reference signals;

and a playback timer connected to said sync reference means and being responsive to the frame reference signals to produce playback timing signals, said playback switch being connected to said playback timer and being responsive to its playback timing signals to alternately combine the portion of the video signal reproduced by one transducer unit with a part of the portion of the video signal reproduced by another transducer unit to form a single picture signal having the picture information of said portion of the video signal in each field thereof.

4. An apparatus for developing a single picture signal from a composite moving picture television signal having picture information, horizontal sync pulses, and vertical sync pulses forming frames of alternate fields, said apparatus comprising:

a storage device including a plurality of transducer units to scan a storage member along a track thereon to reproduce a portion of a composite television signal recorded thereon, each transducer unit being positioned to develop horizontal sync pulses corresponding with those of the composite television signal;

a playback switch connected to said transducer units to combine their reproduced signals into a single picture signal;

a sync reference means connected to said playback switch to develop frame reference signals;

and a playback timer connected to said sync refernce means to produce an alternating first and second series of timing signals, each of one of the series of timing signals having a duration of less than a field and of an integer multiple of the intervals between horizontal sync pulses, and each of the other series of timing signals having a duration of the balance of the interval between frame reference signals, said playback timer being connected to said playback switch to alternately combine the signals reproduced by the transducer units in accordance with the first and second series of timing signals.

5. An apparatus for developing a single picture signal from a composite moving picture television signal having picture information, horizontal sync pulses, and vertical sync pulses forming frames of alternate fields, said apparatus comprising:

a storage device including a pair of transducer units to scan a storage member along a circular track thereon to alternately reproduce a portion of a frame of a composite television signal recorded thereon, each transducer unit being positioned to develop horizontal sync pulses corresponding with those of the composite television signal;

a playback switch connected to said transducer units to combine their reproduced signals into a single picture signal;

a sync reference means connected to said playback switch to develop frame reference signals;

and a playback timer connected to said sync reference means to produce an alternating first and second series of timing signals, each of one of the series of timing signals having a duration of less than a field and an integer multiple of the intervals between horizontal sync pulses, and each of the other series of timing signals having a duration of the balance of the interval between frame reference signals, said playback timer being connected to said playback switch to alternately combine the signals reproduced by the transducer units in accordance with the first and second series of timing signals.

6. An apparatus for developing a single picture signal from a composite moving picture television signal having picture information, horizontal sync pulses, and vertical sync pulses forming frames of alternate fields, said apparatus comprising:

a storage device including a pair of transducer units to scan a storage member along a track thereon to reproduce a portion of a composite television signal recorded thereon, each transducer unit being positioned to develop horizontal sync pulses corresponding with those of the composite television signal;

a playback switch connected to said transducer units to combine their reproduced signals into a single picture signal;

and a switch processing system connected to said playback switch to alternately combine the portion of the composite television signal reproduced by one transducer unit with a part of the portion of the composite television signal in between its vertical sync pulses reproduced by the other transducer unit to form a single picture signal having the picture information of said portion of the composite television signal in each field thereof.

7. An apparatus for developing a single picture signal from a composite moving picture video signal having picture information, horizontal sync pulses, and vertical sync pulses forming frames of alternate fields, said apparatus comprising:

a video signal source to develop a composite video signal; a storage device capable of recording and reproducing a portion of said video signal; a playback circuit for developing a desired output signal;

a normally closed standby operation switch connected to said video signal source and to said playback circuit; a normally open record operation switch connected to said video signal source and to said storage device; a normally open playback operating switch connected to said storage device and to said playback circuit; and a switch processing system including a sync reference means connected to said playback circuit for developing frame reference signals, each reference signal occurring at a selected time inbetween a vertical sync pulse and its subsequent picture information and inbetween horizontal sync pulses, a start means connected to said sync reference means for producing a starting signal, a record timer connected to said start means and to said record operation switch to close the record operation switch during a subsequent frame of the video signal, a playback timer connected to said sync reference means and to said playback switch to produce playback timing signals to alternately combine the reproduced portions of the video signal after the occurrence of said starting signal, and a changeover circuit connected to said standby and record operation switches to open them during said existence of the playback timing signals.

8. The apparatus defined in claim 7 wherein said switch processing system additionally includes a stop means connected to said sync reference means for producing a stopping signal at a subsequent occurring reference signal, and wherein said changeover circuit is connected to said playback timer to terminate said playback timing signals at the occurrence of said stopping signal, and said changeover circuit is responsive to said stopping signal to respectively close and open the standby and record operation switches.

9. The apparatus defined in claim 7 wherein said storage device includes a plurality of transducer units to scan a storage member along a track thereon to reproduce a portion of a composite video signal recorded thereon, each transducer unit being positioned to develop horizontal sync pulses corresponding with those of said composite video signal.

10. The apparatus defined in claim 9 wherein said playback timer produces an alternating first and second series of timing signals, each of one of the series of timing signal having a duration of less than a field and of an integer multiple of the intervals between horizontal sync pulses, and each of the other series of timing signals having a duration of the balance of the interval between reference signals, said playback timer alternately combining the signals reproduced by said transducer units in accordance with said first and second series of timing signals.

11. The apparatus defined in claim 10 wherein said switch processing system additionally includes a stop means connected to said sync reference means for producing a stopping signal at a subsequent occurring reference signal, and wherein said changeover circuit is connected to said playback timer to terminate said playback timing signals upon said occurrence of the stopping signal, and said changeover circuit is responsive to said stopping signal to respectively close and open said standby and record switches.

12. The apparatus defined in claim 11 which additionally includes a clamp signal generator connected to said playback timer for producing clamp blanking pulses at the beginning and end of each playback timing signal, and connected to said playback circuit to eliminate switching transients therein.

13. An apparatus for developing a single picture signal from a composite moving picture video signal having picture information, horizontal sync pulses, and vertical sync pulses forming frames of alternate fields, said apparatus comprising:

a video signal source to develop a composite video signal; a playback circuit for developing a desired output signal, an erase circuit for providing an erase signal;

a storage device including a pair of transducer units to scan a storage member along a track thereon, and including an erase head to erase any signal recorded on said track;

a normally closed standby operation switch connected to said video signal source and to said playback circuit; a normally open record operation switch connected to said video signal source and to the storage device; a normally open playback operation switch connected to the storage device and to the playback circuit; and a switch processing system including a sync reference means connected to said playback circuit for developing frame reference signals, each reference signal occurring at a selected time inbetween a vertical sync pulse and its subsequent picture information and inbetween horizontal sync pulses, a start means connected to said sync reference means for producing a starting signal, an erase timer connected to said start means and inbetween said erase circuit and said erase head to connect them to erase said track during the next occurring frame of the video signal after said starting signal, a record timer connected to said erase timer and to said record operation switch to close said record operation switch during said subsequent frame of the video signal, a playback timer connected to said sync reference means and to said playback switch to produce playback timing signals to combine the portions of the video signal after said subsequent frame of said video signal, and a changeover circuit connected to said standby and record operation switches to open them during the existence of said playback timing signals.

14. The apparatus defined in claim 13 wherein said playback timer produces an alternating first and second series of timing signals, each of one of the series of timing signal having a duration of less than a field and of an integer multiple of the intervals between horizontal sync pulses, and each of the other series of timing signals having a duration of the balance of the interval between reference signals, said playback timer alternately combining the signals reproduced by said transducer units in accordance with said first and second series of timing signals.

15. The apparatus defined in claim 14 wherein said switch processing system additionally includes a stop means connected to said sync reference means for producing a stopping signal at a subsequent occurring reference signal, and wherein said changeover circuit is connected to said playback timer to terminate said playback timing signals at the occurrence of said stopping signal, and said changeover circuit is responsive to said stopping signal to respectively close and open said standby and record operation switches.

16. The apparatus defined in claim 15 which additionally includes a clamp signal generator connected to said playback timer for producing clamp blanking pulses at the beginning and end of each playback timing signal, and connected to said playback circuit to eliminate switching transients therein.

17. A switch processing system for an apparatus having transducer units to scan a storage member along a track thereon to reproduce a portion of a video signal recorded thereon with sync pulses corresponding to those of the video signal, said system comprising:

a playback switch connected to the transducer units to combine their reproduced signals into a single picture signal;

a sync reference means connected to said playback switch to develop frame reference signals;

and a playback timer connected to said sync reference to produce a pair of playback timing signals between each reference signal;

said playback switch being connected to said playback timer and being responsive to its playback timing signals to alternately combine the portion of the video signal reproduced by one transducer unit with a part of the portion of the video signal reproduced by another transducer unit to form a single picture signal having the picture information of said portion of the video signal in each field thereof.

18. A switch processing system for an apparatus having transducer units to scan a storage member along a track thereon to reproduce a portion of a video signal recorded thereon with sync pulses corresponding to those of the video signal, said processing system comprising:

a playback switch connected to said transducer units to combine their reproduced signals;

a sync reference means connected to said playback switch to develop frame reference signals;

and a playback timer connected to said sync reference means to produce an alternating first and second series of timing signals, each of one of said series of timing signals starting at a reference signal and having a duration of less than a field and of an integer multiple of the intervals between horizontal sync pulses, and each of the other of said series of timing signals having a duration of the balance of the interval between frame reference signals, said playback timer being connected to said playback switch to alternately combine the signals reproduced by said transducer units in accordance with said first and second series of timing signals.

19. The switch processing system defined in claim 17 which additionally includes a start means connected to said sync reference means and to said playback timer to produce a starting signal operable to turn on said playback timer, and a stop means connected to said sync reference means and to the playback timer to produce a stopping signal operable to turn off said playback timer at a subsequent occurring reference signal.

20. The switch processing system defined in claim 18 which additionally includes a start means connected to said sync reference means and to said playback timer to produce a starting signal operable to turn on said playback timer, and a stop means connected to said sync reference means and to said playback timer to produce a stopping signal operable to turn off the playback timer at a subsequent occurring reference signal.

21. A switch processing system for an apparatus having transducer units adapted to scan a storage member along a track thereon to record and reproduce a portion of a video signal on said storage member with sync pulses corresponding to those of the video signal, said system comprising:

a sync reference means for receiving a video signal to develop frame reference signals, each reference signal occurring at a selected time inbetween a vertical sync pulse and its subsequent picture information, and inbetween horizontal sync pulses;

a record timer connected to said sync reference means to develop a record switching signal during a frame of the video signal;

and a playback timer connected to said sync reference means and to said record timer to develop a first and second series of playback timing signals at the termination of said record switching signal, each of the first series of playback timing signals starting at a reference signal and having a duration of less than a field and of an integer multiple of the intervals between horizontal sync pulses, and each of the second series of timing signals having a duration of the balance of the interval between frame reference signals.

22. The switch processing system defined in claim 21 which additionally includes a start means connected to said sync reference means and to said playback timer to produce a starting signal operable to turn on said playback timer, and a stop means connected to said sync reference means and to said playback timer to produce a stopping signal operable to turn off the playback timer at a subsequent occurring reference signal.

23. A switch processing system for a storage device capable of recording and reproducing a video signal therein with sync pulses corresponding to those of the video signal, said system comprising:

a sync reference means for receiving a video signal to develop frame reference signals, each reference signal occurring at a selected time inbetween a vertical sync pulse and its subsequent picture information, and inbetween horizontal sync pulses;

an erase timer connected to said sync reference means to develop an erase switching signal during a frame of the video signal;

a record timer connected to said sync reference means to develop a record switching signal during said frame of the video signal;

and a playback timer connected to said sync reference means and to said record timer to develop a first and second series of playback timing signals at the termination of the record switching signal, each of the first series of playback timing signals starting at a reference signal and having a duration of less than a field and of an integer multiple of the intervals between horizontal sync pulses, and each of the second series of timing signals having a duration of the balance of the interval between frame reference signals.

24. The switch processing system defined in claim 23 which additionally includes a start means connected to said sync reference means and to said playback timer to produce a starting signal operable to turn on said playback timer, and a stop means connected to said sync reference means and to said playback timer to produce a stopping signal operable to turn off the playback timer at a subsequent occurring reference signal.

25. An apparatus for developing a single picture signal from a composite moving picture video signal having picture information, horizontal sync pulses, and vertical sync pulses forming frames of alternate fields, said apparatus comprising:

a storage device for recording and reproducing a video signal with sync pulses corresponding to those of the video signal;

a sync reference means for receiving a signal having picture information, horizontal sync pulses, and vertical sync pulses to develop frame reference signals, each reference signal occurring at a selected time inbetween a vertical sync pulse and its subsequent picture information, and inbetween horizontal sync pulses;

a record timer connected to said sync reference means to develop a record switching signal during a frame of the video signal, said storage device being operable to record a video signal during said record switching signal;

and a playback timer connected to said sync reference means and to said record timer to develop a first and second series of playback timing signals at the termination of the record switching signal, each of the first series of playback timing signals starting at a reference signal and having a duration of less than a field and of an integer multiple of the intervals between horizontal sync pulses, and each of the second series of timing signals having a duration of the balance of the interval between frame reference signals, said storage device being operable to reproduce said video signal during said playback timing signals.

26. The apparatus defined in claim 25 in which said switch processing system additionally includes a start means connected to said sync reference means and to said playback timer to produce a starting signal operable to turn on said playback timer, and a stop means connected to said sync reference means and to said playback timer to produce a stopping signal operable to turn off said playback timer.

27. The apparatus defined in claim 26 which additionally includes a clamp signal generator connected to said playback timer to produce clamp blanking pulses at the beginning and at the end of each playback timing signal which are operable to eliminate switching transients.

References Cited

UNITED STATES PATENTS

| | | | |
|---|---|---|---|
| 3,051,777 | 8/1962 | Lemelson | 178—6.6 |
| 3,215,772 | 11/1965 | Kihara | 178—6.6 |
| 2,955,157 | 10/1960 | Young | 178—6.6 |
| 3,026,369 | 3/1962 | Lohmann et al. | 178—6.6 |
| 3,397,283 | 8/1968 | Stosberg et al. | 178—6.6 |

ROBERT L. GRIFFIN, Primary Examiner

R. K. ECKERT, Jr., Assistant Examiner

U.S. Cl. X.R.

179—100.2